United States Patent
Chen et al.

(10) Patent No.: US 12,548,210 B2
(45) Date of Patent: Feb. 10, 2026

(54) LOCAL ATTRIBUTE IMAGE EDITING USING AN IMAGE GENERATION MODEL AND A FEATURE IMAGE GENERATION MODEL

(71) Applicant: Tencent Technology (Shenzhen) Company Limited, Guangdong (CN)

(72) Inventors: Haokun Chen, Shenzhen (CN); Ruixue Shen, Shenzhen (CN); Rui Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 176 days.

(21) Appl. No.: 18/584,777

(22) Filed: Feb. 22, 2024

(65) Prior Publication Data
US 2024/0193822 A1   Jun. 13, 2024

Related U.S. Application Data

(63) Continuation of application No. PCT/CN2023/119716, filed on Sep. 19, 2023.

(30) Foreign Application Priority Data

Oct. 28, 2022   (CN) .......................... 202211330943.1

(51) Int. Cl.
    *G06T 11/00*    (2006.01)
    *G06T 3/40*    (2024.01)
    *G06T 7/33*    (2017.01)

(52) U.S. Cl.
    CPC ................ *G06T 11/00* (2013.01); *G06T 3/40* (2013.01); *G06T 7/337* (2017.01);
(Continued)

(58) Field of Classification Search
None
See application file for complete search history.

(56) References Cited

U.S. PATENT DOCUMENTS

| | | | | |
|---|---|---|---|---|
| 2021/0398334 A1* | 12/2021 | He | .......................... | G06N 3/045 |
| 2022/0207913 A1* | 6/2022 | Zeng | ...................... | G06V 10/82 |
| 2023/0401682 A1* | 12/2023 | Hu | ........................ | G06V 10/774 |

FOREIGN PATENT DOCUMENTS

| | | | | |
|---|---|---|---|---|
| CN | 111402181 A | * | 7/2020 | ........... G06F 18/241 |
| CN | 115393183 A | | 11/2022 | |

OTHER PUBLICATIONS

International Search Report and Written Opinion received for PCT Patent Application No. PCT/CN2023/119716, mailed on Dec. 25, 2023, 14 pages (5 pages of English Translation and 9 pages of Original Document).

\* cited by examiner

*Primary Examiner* — Yanna Wu
(74) *Attorney, Agent, or Firm* — ARENTFOX SCHIFF LLP

(57) ABSTRACT

An image editing method includes acquiring an initial image generation model and a feature image generation model, the initial image generation model having been trained based on a first training image set, the feature image generation model having been obtained by training the initial image generation model based on a second training image set. The method further includes acquiring a joint mask image based on image regions corresponding to the target attribute in the object images, and acquiring a second initial object image and a second feature object image output by corresponding target network layers. The method further includes fusing the second initial object image and the second feature object image based on the joint mask image to obtain a reference object image.

20 Claims, 12 Drawing Sheets

(52) U.S. Cl.
CPC ............... *G06T 2207/20081* (2013.01); *G06T 2207/20092* (2013.01); *G06T 2207/30201* (2013.01)

LOCAL ATTRIBUTE IMAGE EDITING USING AN IMAGE GENERATION MODEL AND A FEATURE IMAGE GENERATION MODEL

RELATED APPLICATIONS

This application is a continuation of International Application No. PCT/CN2023/119716, filed on Sep. 19, 2023, which claims priority to Chinese Patent Application No. 202211330943.1, filed on Oct. 28, 2022, and entitled "IMAGE EDITING METHOD AND APPARATUS, COMPUTER DEVICE, AND STORAGE MEDIUM." The disclosures of the prior applications are hereby incorporated by reference in their entirety.

FIELD OF THE TECHNOLOGY

This disclosure relates to the field of image processing technologies, including an image editing method and apparatus, a computer device, a storage medium, and a computer program products.

BACKGROUND OF THE DISCLOSURE

With the development of image processing technologies, the image editing technology for image attributes has emerged. The image editing technology for image attributes are used for editing local attributes of original images to obtain new images. Face attribute editing for face images is used as an example. Face attribute editing refers to editing one or at least two face attributes of original face pictures to generate new face images. In other words, local attributes of the original face pictures are modified, without changing the other attributes.

In the related technology, the image editing technology for image attributes usually uses image editing software such as PhotoShop to manually edit images accurately. For example, a fusion tool of PhotoShop is used to cut target attribute regions of other faces onto the current face image. However, this method requires careful editing by professionals, and thus results in inefficient image editing.

SUMMARY

Aspects of this disclosure provide an image editing method and apparatus, a computer device, a computer-readable storage medium, and a computer program product.

In an aspect, an image editing method includes acquiring an initial image generation model and a feature image generation model, the initial image generation model having been trained based on a first training image set. The feature image generation model was obtained by training the initial image generation model based on a second training image set, object images in the first training image set and the second training image set including objects of a same category. Each object image in the second training image set includes a target attribute, and an image output by the feature image generation model has the target attribute. The method further includes, based on an image editing request, inputting a value of a first variable as input data into the initial image generation model and the feature image generation model separately. The method further includes, in response to the input data, acquiring an image output by the initial image generation model to obtain a first initial object image of the category, and acquiring an image output by the feature image generation model to obtain a first feature object image of the category. The method further includes, based on image regions corresponding to the target attribute in the object images, acquiring attribute mask images respectively corresponding to the first initial object image and the first feature object image, and obtaining a joint mask image based on the attribute mask images. The method further includes acquiring images output by corresponding target network layers in the initial image generation model and the feature image generation model to obtain a second initial object image and a second feature object image, and fusing the second initial object image and the second feature object image based on the joint mask image to obtain a reference object image, as a result of performing target attribute editing on the second initial object image.

In an aspect, an image editing apparatus includes processing circuitry configured to acquire an initial image generation model and a feature image generation model, the initial image generation model having been trained based on a first training image set. The feature image generation model was obtained by training the initial image generation model based on a second training image set, object images in the first training image set and the second training image set including objects of a same category. Each object image in the second training image set includes a target attribute, and an image output by the feature image generation model has the target attribute. The processing circuitry is further configured to, based on an image editing request, input a value of a first variable as input data into the initial image generation model and the feature image generation model separately. The processing circuitry is further configured to, in response to the input data, acquire an image output by the initial image generation model to obtain a first initial object image of the category, and acquire an image output by the feature image generation model to obtain a first feature object image of the category. The processing circuitry is further configured to, based on image regions corresponding to the target attribute in the object images, acquire attribute mask images respectively corresponding to the first initial object image and the first feature object image, and obtain a joint mask image based on the attribute mask images. The processing circuitry is further configured to acquire images output by corresponding target network layers in the initial image generation model and the feature image generation model to obtain a second initial object image and a second feature object image. The processing circuitry is further configured to fuse the second initial object image and the second feature object image based on the joint mask image to obtain a reference object image, as a result of performing target attribute editing on the second initial object image.

In an aspect, a non-transitory computer-readable storage medium stores computer-readable instructions thereon, which, when executed by processing circuitry, cause the processing circuitry to perform an image editing method that includes acquiring an initial image generation model and a feature image generation model, the initial image generation model having been trained based on a first training image set. The feature image generation model was obtained by training the initial image generation model based on a second training image set, object images in the first training image set and the second training image set including objects of a same category. Each object image in the second training image set includes a target attribute, and an image output by the feature image generation model has the target attribute. The method further includes, based on an image editing request, inputting a value of a first variable as input data into the initial image generation model and the feature image generation model separately. The method further includes, in response to the input data, acquiring an image output by the initial image generation model to obtain a first initial object image of the category, and acquiring an image output by the feature image generation model to obtain a first feature object image of the category. The method further includes, based on image regions corresponding to the target attribute in the object images, acquiring attribute mask images respectively corresponding to the first initial object image and the first feature object image, and obtaining a joint mask image based on the attribute mask images. The method further includes acquiring images output by corresponding target network layers in the initial image generation model and the feature image generation model to obtain a second initial object image and a second feature object image, and fusing the second initial object image and the second feature object image based on the joint mask image to obtain a reference object image, as a result of performing target attribute editing on the second initial object image.

Details of one or more aspects of this disclosure are provided in the accompanying drawings and descriptions below. Other features, objectives, and advantages of this disclosure become apparent from the description, the accompanying drawings, and the claims.

BRIEF DESCRIPTION OF THE DRAWINGS

To describe the technical solutions of aspects of this disclosure more clearly, the following briefly introduces the accompanying drawings required for describing the aspects. The accompanying drawings in the following description show only some aspects of this disclosure, and a person of ordinary skill in the art may still derive other drawings from these accompanying drawings.

DETAILED DESCRIPTION

To make the objectives, technical solutions, and advantages of this disclosure clearer, the following further describes this disclosure in detail with reference to the accompanying drawings and the aspects. It is to be understood that the specific aspects described herein are merely used to explain this disclosure but are not intended to limit this disclosure.

The solutions provided by aspects of this disclosure involve technologies, such as computer vision technology and machine learning of artificial intelligence, which are described in detail in the following aspects.

Figure 1:
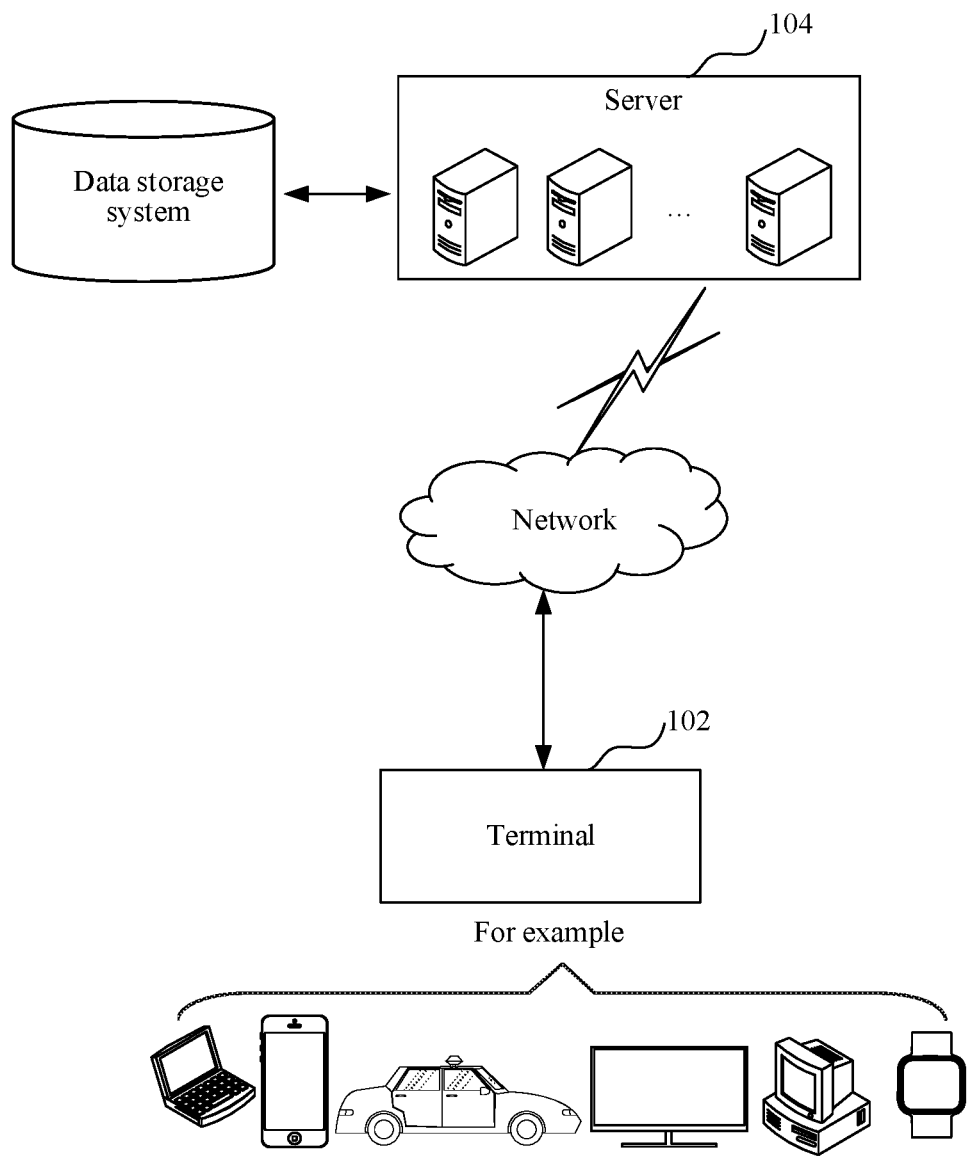
FIG. 1 is a diagram of an application environment of an image editing method according to an aspect.

An image editing method provided in one aspect of this disclosure may be applied to an application environment as shown in FIG. 1. A terminal 102 communicates with a server 104 over a network. A data storage system may store data that the server 104 needs to process. The data storage system may be integrated on the server 104, or may be provided on a cloud or another server. The terminal 102 may be but is not limited to a variety of desktop computers, notebook computers, smart phones, tablets, Internet of Things devices, and portable wearable devices. The Internet of things devices may be smart speakers, smart televisions, smart air conditioners, smart vehicle-mounted devices, or the like. The portable wearable devices may be smart watches, smart bracelets, head-mounted devices, or the like. The server 104 may be implemented as an independent server or a server cluster that includes a plurality of servers or a cloud server.

Both the terminal and the server may be used separately to perform the image editing method provided in the aspect of this disclosure.

For example, the server acquires a first random variable and inputs the first random variable into an initial image generation model and a feature image generation model separately. The initial image generation model is trained based on a first training image set. The feature image generation model is obtained by training the initial image generation model based on a second training image set. The first training image set and the second training image set include object images corresponding to target category objects. Each object image in the second training image set is an object image including a target attribute. An image outputted by the feature image generation model has the target attribute. The server acquires an image outputted by a first network layer in the initial image generation model to obtain a first initial object image, acquires an image outputted by a second network layer in the feature image generation model to obtain a first feature object image, acquires, based on image regions corresponding to an attribute type of the target attribute in the object images, attribute mask images respectively corresponding to the first initial object image and the first feature object image, and obtains a target joint mask image based on the attribute mask images. The server acquires images outputted by target network layers matched in the initial image generation model and the feature image generation model to obtain a second initial object image and a second feature object image. The server fuses the second initial object image and the second feature object image based on the target joint mask image to obtain a reference object image. The reference object image is used for representing an image obtained by performing target attribute editing on the second initial object image.

The terminal and the server may also be used cooperatively to perform the image editing method provided in the aspect of this disclosure.

For example, the server acquires a first random variable based on an image editing request transmitted by the terminal and inputs the first random variable into an initial image generation model and a feature image generation model separately; acquires an image outputted by a first network layer in the initial image generation model to obtain a first initial object image, and acquires an image outputted by a second network layer in the feature image generation model to obtain a first feature object image; and acquires images outputted by target network layers matched in the initial image generation model and the feature image generation model to obtain a second initial object image and a second feature object image. The server acquires, based on image regions corresponding to an attribute type of the target attribute in the object images, attribute mask images respectively corresponding to the first initial object image and the first feature object image, and obtains a target joint mask image based on the attribute mask images. The server fuses the second initial object image and the second feature object image based on the target joint mask image to obtain a reference object image. The server transmits the reference object image to the terminal. The terminal may display the reference object image.

In this way, the initial image generation model is trained based on object images corresponding to the target category objects. After receiving input data, the initial image generation model may output the object images corresponding to the target category objects. The feature image generation model is obtained by training the initial image generation model based on the object images corresponding to the target category objects and including the target attribute. After receiving input data, the feature image generation model may output the object images corresponding to the target category objects and including the target attribute. The first random variable is inputted into the initial image generation model and the feature image generation model separately. The object images outputted by the initial image generation model and the feature image generation model respectively have specific similarities. The object image outputted by the feature image generation model includes the target attribute. The attribute mask image may reflect an image region corresponding to the attribute type of the target attribute in the object image. The target joint mask image may reflect a joint image region of the attribute type of the target attribute in the first initial object image and the first feature object image. The second initial object image and the second feature object image are fused based on the target joint mask image. The image region corresponding to the target attribute in the second feature object image may be fused into the second initial object image. In this way, the reference object image obtained after fusion equivalently has the target attribute without changing other attributes of the second initial object image. In other words, the reference object image is equivalent to an image obtained by performing target attribute editing on the second initial object image. Target attribute editing performed on an output image of the initial image generation model may be implemented quickly based on the initial image generation model, the feature image generation model, and the target joint mask image without manual fine editing. This improves efficiency of image editing and also ensures accuracy of image editing.

Figure 2:
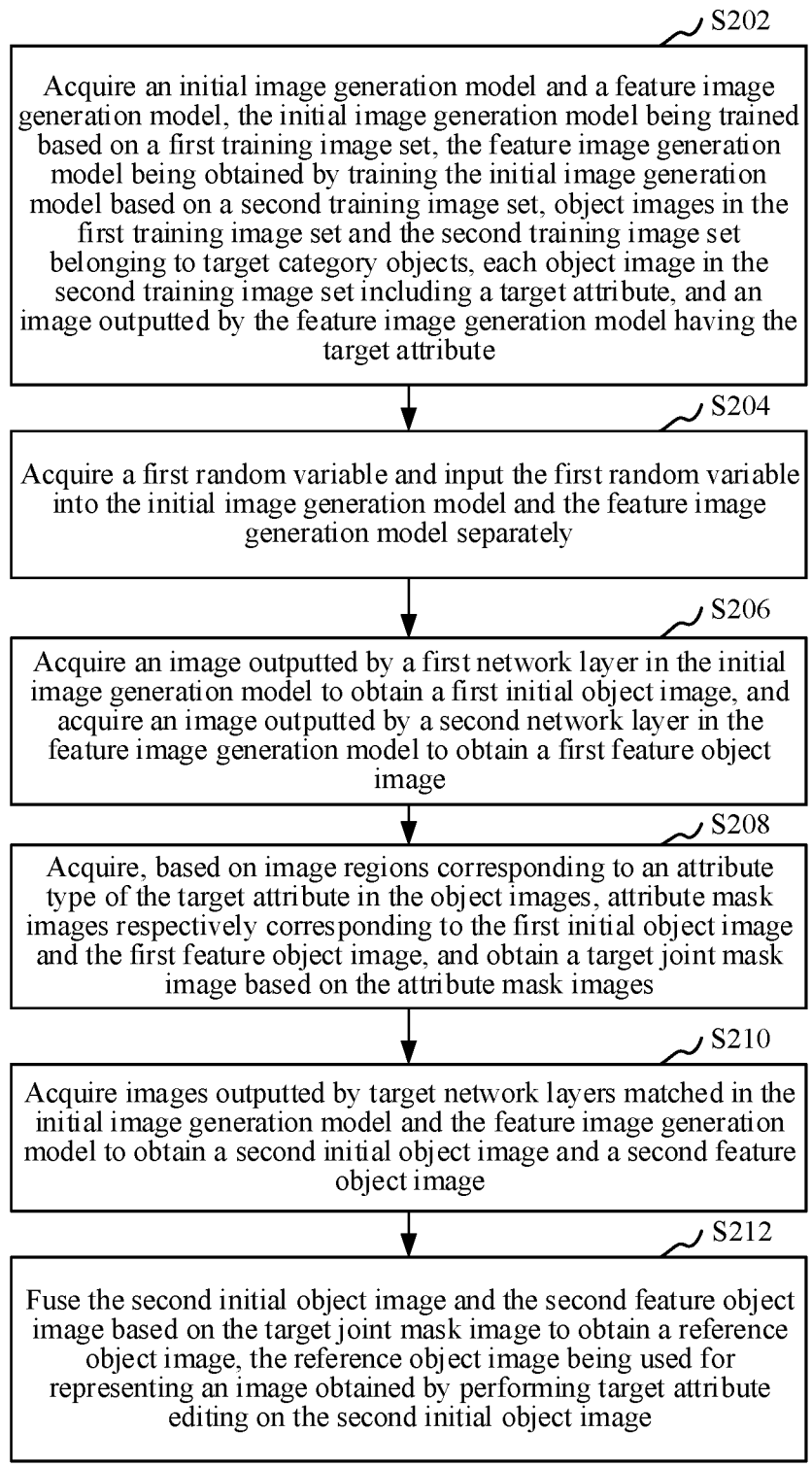
FIG. 2 is a schematic flowchart of an image editing method according to an aspect.

In one aspect, as shown in FIG. 2, an image editing method is provided. The method is applied to a computer device as an example for description. The computer device may be a terminal or a server. The method may be performed independently by the terminal or the server, or may be implemented through interaction between the terminal and the server. Refer to FIG. 2, the image editing method includes the following steps:

Step S202: Acquire an initial image generation model and a feature image generation model, the initial image generation model being trained based on a first training image set, the feature image generation model being obtained by training the initial image generation model based on a second training image set, object images in the first training image set and the second training image set belonging to target category objects, each object image in the second training image set including a target attribute, and an image outputted by the feature image generation model having the target attribute. For example, an initial image generation model trained based on a first training image set and a feature image generation model obtained by training the initial image generation model based on a second training image set are acquired. Object images in the first training image set and the second training image set include objects of a same category.

The image generation model is a machine learning model, used for generating an image. Input data of the image generation model is a random variable, and output data of the image generation model is an image. The image generation model is usually trained based on a training image set. The training image set includes object images of a plurality of objects belonging to a same category, so that the image generation model trained based on the training image set may be configured to generate object images of specific category objects. For example, an image generation model configured to generate a face image is trained based on a face image set. An image generation model configured to generate a cat image is trained based on a cat image training set. An image generation model configured to generate a vehicle image is trained based on a vehicle image training set. It is to be understood that objects may be substances, such as cars, tables, or the like, or objects may also be living beings, such as animals, plants, or the like.

The first training image set includes object images corresponding to target category objects. In other words, the first training image set includes a plurality of object images, and the object images in the first training image set belong to the target category objects. The initial image generation model is an image generation model trained based on the first training image set. The initial image generation model is configured to generate object images belonging to the target category objects. The target category objects refer to a specific category of objects. For example, in a case that the target category objects are faces, the first training image set includes a plurality of face images, and the initial image generation model is configured to generate face images. In a case that the target category objects are dogs, the first training image set includes a plurality of dog images, and the initial image generation model is configured to generate dog images. In a case that the target category objects are cats, the first training image set includes a plurality of cat images, and the initial image generation model is configured to generate cat images. In a case that the target category objects are vehicles the first training image set includes a plurality of vehicle images, and the initial image generation model is configured to generate vehicle images.

The second training image set includes object images corresponding to the target category objects and including the target attribute. In other words, the second training image set includes a plurality of object images, and the object images in the second training image set belong to the target category objects and include the target attribute. The feature image generation model is an image generation model trained based on the second training image set. The feature image generation model is configured to generate object images belonging to the target category objects and including the target attribute. In other words, the feature image generation model is configured to generate object images belonging to the target category objects and having a specific feature. An object image has different types of target attributes. One type of target attributes (that is, one attribute type) corresponds to one image region in the object image, and one type of target attributes is used for representing one type of features and characteristics of an object. One type of target attributes is a generic term of a plurality of specific target attributes of a same type. There are commonalities among the plurality of specific target attributes of a same type. The plurality of specific target attributes of a same type are used for describing a same part of an object, and different specific target attributes of a same type may allow the same part to have different forms. For example, a face image includes a hair-type attribute. The hair-type attribute is used for representing and describing the hair of the object. The hair-type attribute may include hair attributes used for representing different hair styles, which may be specifically a slicked-back hair attribute, a short hair attribute, a long hair attribute, a curly hair attribute, and the like. A cat image includes a cat leg-type attribute. The cat leg-type attribute is used for representing and describing the leg of a cat. The cat leg-type attribute may include leg attributes used for representing different legs of the cat, which may be specifically a long leg attribute, a short leg attribute, and the like. The target attribute refers to a specific target attribute, for example, the slicked-back hair attribute or the long leg attribute. The target attribute may also refer to at least two specific target attributes belonging to different attribute types, for example, the slicked-back hair attribute+a whisker attribute.

For example, in a case that the target category objects are vehicles, the first training image set specifically includes various vehicle images, and the initial image generation model is configured to generate a vehicle image. Further, in a case that the target attribute is a skylight attribute, the second training image set specifically includes vehicle images in which skylights are provided on the tops of vehicles, and the feature image generation model is configured to generate a vehicle image in which a skylight is provided on the top of a vehicle.

Further, the feature image generation model is obtained by further training the initial image generation model based on the second training image set. In other words, the feature image generation model is obtained by fine-tuning the initial image generation model based on the second training image set. In a case that input data of the feature image generation model and input data of the initial image generation model are consistent, images outputted by the feature image generation model and the initial image generation model have specific similarities. Upon comparison, the image outputted by the initial image generation model mainly differs from the image outputted by the feature image generation model in that the image outputted by the feature image generation model has the target attribute. For example, the initial image generation model is configured to generate a face image, and the feature image generation model is configured to generate a face image with a slicked-back hair feature. A same random variable is inputted into the feature image generation model and the initial image generation model separately, and then the face images outputted by the feature image generation model and the initial image generation model have similar facial features. The hair style in the face image outputted by the feature image generation model is slicked-back hair.

Specifically, the initial image generation model and the feature image generation model may be trained in advance. The computer device acquires the initial image generation model and the feature image generation model locally or from other devices. Target attribute editing for an image is implemented quickly based on the initial image generation model and the feature image generation model.

Step S204: Acquire a first random variable and input the first random variable into the initial image generation model and the feature image generation model separately. For example, based on an image editing request, a value of a first variable is input as input data into the initial image generation model and the feature image generation model separately.

A variable is data whose value may change. A random variable is a variable that is randomly generated. For example, a random variable may be data that is randomly sampled based on Gaussian distribution, a random variable may be data that is sampled randomly based on uniform distribution, or the like. The first random variable is a specific random variable.

Step S206: Acquire an image outputted by a first network layer in the initial image generation model to obtain a first initial object image, and acquire an image outputted by a second network layer in the feature image generation model to obtain a first feature object image. For example, in response to the input data, an image output by the initial image generation model is acquired to obtain a first initial object image of the category. An image output by the feature image generation model is acquired to obtain a first feature object image of the category.

The image generation model includes a plurality of network layers connected in sequence, and each network layer may output a corresponding object image. It is to be understood that an image outputted by an end network layer of the image generation model is an image with the highest image quality among images outputted by all the network layers. An initial object image is an object image obtained after data processing of the initial image generation model. A feature object image is an object image obtained after data processing of the feature image generation model. The first initial object image is the image outputted by the first network layer in the initial image generation model, and the first feature object image is the image outputted by the second network layer in the feature image generation model. The feature image generation model is obtained by fine-tuning the initial image generation model. The feature image generation model and the initial image generation model include a same model structure, but have different model parameters. In other words, the feature image generation model and the initial image generation model have a same quantity of network layers. The first network layer and the second network layer may be network layers having a same layer serial number in the two models. For example, the first network layer is an end network layer in the initial image generation model, and the second network layer is the end network layer in the feature image generation model. The first network layer and the second network layer may also be network layers having different layer serial numbers in the two models. For example, the first network layer is the seventh layer in the initial image generation model, and the second network layer is the eleventh layer in the feature image generation model.

Specifically, the computer device acquires the first random variable, inputs the first random variable into the initial image generation model and the feature image generation model separately, acquires the image outputted by the first network layer in the initial image generation model as the first initial object image, and acquires the image outputted by the second network layer in the feature image generation model as the first feature object image.

Step S208: Acquire, based on image regions corresponding to an attribute type of the target attribute in the object images, attribute mask images respectively corresponding to the first initial object image and the first feature object image, and obtain a target joint mask image based on the attribute mask images. For example, based on image regions corresponding to the target attribute in the object images, attribute mask images are respectively acquired corresponding to the first initial object image and the first feature object image.

An attribute type refers to a type of target attributes. The attribute type of the target attribute corresponds to an image region in each object image. For example, for a face image, in a case that the target attribute is the slicked-back hair attribute, the attribute type of the slicked-back hair attribute is the hair-type attribute, and an image region corresponding to the hair-type attribute is a hair region in the image. For a vehicle image, in a case that the target attribute is a convertible attribute, the attribute type of the convertible attribute is a roof-type attribute, and an image region corresponding to the roof-type attribute is a roof region in the image.

A mask is used for shielding one part of an image and displaying another part of the image. An attribute mask image is used for determining a position of a specific type of target attributes in an object image. To implement subsequent target attribute editing, in the attribute mask image, the image region corresponding to the attribute type of the target attribute in the object image is a displayed part, and other image regions of the object image are a shielded part. The attribute mask image includes a shielded region and a non-shielded region. The non-shielded region refers to the displayed part of the object image. In other words, the non-shielded region is the image region corresponding to the attribute type of the target attribute in the object image. The shielded region refers to the shielded part in the object image. In other words, the shielded region is other image regions in the object image other than the image region corresponding to the attribute type of the target attribute. In one aspect, the attribute mask image is a binary image, the shielded part is represented by a pixel value 0, and the non-shielded part is represented by a pixel value 1.

The target joint mask image is obtained based on the attribute mask images respectively corresponding to the first initial object image and the first feature object image, and is used for determining a joint position of a specific type of target attributes in the first initial object image and the first feature object image.

Specifically, after acquiring the first initial object image and the first feature object image, the computer device may acquire, based on the image regions corresponding to the attribute type of the target attribute in the object images, the attribute mask images respectively corresponding to the first initial object image and the first feature object image. The attribute mask image corresponding to the first initial object image is generated based on the image region corresponding to the attribute type of the target attribute in the first initial object image. The attribute mask image corresponding to the first feature object image is generated based on the image region corresponding to the attribute type of the target attribute in the first feature object image. Then, the computer device obtains the target joint mask image based on the attribute mask images corresponding to the first initial object image and the first feature object image. For example, an intersection of the attribute mask images corresponding to the first initial object image and the first feature object image is calculated to obtain the target joint mask image, a union of the attribute mask images corresponding to the first initial object image and the first feature object image is calculated to obtain the target joint mask image, or the like.

It is to be understood that the computer device may acquire the attribute mask images corresponding to the object images by using a machine learning model, or may acquire the attribute mask images corresponding to the object images through other means. This disclosure does not limit means of acquiring the attribute mask images.

Step S210: Acquire images outputted by target network layers matched in the initial image generation model and the feature image generation model to obtain a second initial object image and a second feature object image. For example, images output by corresponding target network layers in the initial image generation model and the feature image generation model are acquired to obtain a second initial object image and a second feature object image.

The second initial object image is an image outputted by a network layer in the initial image generation model. The second feature object image is an image outputted by a network layer in the feature image generation model. The second initial object image and the second feature object image are images outputted by the target network layers matched in the initial image generation model and the feature image generation model respectively. The target network layers matched in the initial image generation model and the feature image generation model may be network layers having a same layer serial number in the initial image generation model and the feature image generation model. The image generation model includes a plurality of network layers connected in sequence, the network layers may output corresponding object images, and the target network layer may be any network layer in the network layers.

It is to be understood that in the initial image generation model, the network layer that outputs the first initial object image and the network layer that outputs the second initial object image may be a same network layer or may be different network layers. In the feature image generation model, the network layer that outputs the first feature object image and the network layer that outputs the second feature object image may be a same network layer or may be different network layers.

Specifically, the computer device inputs the first random variable into the initial image generation model and the feature image generation model separately, and acquires the images outputted by the target network layers matched in the initial image generation model and the feature image generation model to obtain the second initial object image and the second feature object image.

It is to be understood that the operation of acquiring the second initial object image and the second feature object image may be performed simultaneously with the operation of acquiring the first initial object image and the first feature object image, or two operations may be performed asynchronously.

Step S212: Fuse the second initial object image and the second feature object image based on the target joint mask image to obtain a reference object image, the reference object image being used for representing an image obtained by performing target attribute editing on the second initial object image. For example, the second initial object image and the second feature object image are fused based on the joint mask image to obtain a reference object image, as a result of performing target attribute editing on the second initial object image.

Target attribute editing refers to editing the image so that the edited image has the target attribute.

Specifically, the computer device may fuse the second initial object image and the second feature object image based on the target joint mask image, and fuse an image region corresponding to a non-shielded region of the target joint mask image in the second feature object image into the second initial object image, to obtain the reference object image. The reference object image is used for representing the image obtained by performing target attribute editing on the second initial object image. In other words, the reference object image is obtained by modifying the image region corresponding to the attribute type of the target attribute to the target attribute without changing other image regions of the second initial object image. For example, for a face image, the target attribute may be the slicked-back hair attribute, and the reference object image is obtained by modifying the hair region in the second initial face image to the slicked-back hair attribute, that is, the hair style of the face in the second initial face image is the slicked-back hair. For a vehicle image, the target attribute may be the skylight attribute, and the reference object image is obtained by modifying a roof region in a second initial vehicle image to the skylight attribute, that is, the roof of the second initial vehicle image has a skylight.

The second initial object image and the second feature object image are fused based on the target joint mask image to implement target attribute editing. A coherent region of the target attribute may be accurately edited without changing other incoherent regions in the second initial object image.

It is to be understood that in a case that another attribute editing needs to be performed, a second training image set corresponding to a new target attribute needs to be required. The initial image generation model is fine-tuned based on the new second training image set to obtain a new feature image generation model. Editing on the image for the new target attribute is implemented based on the initial image generation model and the new feature image generation model. For example, in a case that whisker editing needs to be performed for a face image, face images including whiskers need to be acquired as the second training image set. The initial face image generation model is fine-tuned based on the second training image set to obtain a feature face image generation model for generating face images including whiskers. In a case that with slicked-back hair editing needs to be performed for a face image, face images including slicked-back hair need to be required as the second training image set. The initial face image generation model is fine-tuned based on the second training image set to obtain a feature face image generation model for generating face images including slicked-back hair.

It is to be understood that in a case that at least two attributes need to be edited at the same time, the corresponding second training image set may be required to fine-tune the initial image generation model, to obtain a feature image generation model for generating object images including at least two attributes at the same time. For example, in a case that both whisker editing and slicked-back hair editing need to be performed for a face image, face images including both whiskers and slicked-back hair may be acquired as a second training image set. The initial face image generation model is fine-tuned based on the second training image set to obtain a feature face image generation model for generating face images including both whiskers and slicked-back hair.

In the foregoing image editing method, the initial image generation model is trained based on object images corresponding to the target category objects. After receiving input data, the initial image generation model may output the object images corresponding to the target category objects. The feature image generation model is obtained by training the initial image generation model based on the object images corresponding to the target category objects and including the target attribute. After receiving input data, the feature image generation model may output the object images corresponding to the target category objects and including the target attribute. The first random variable is inputted into the initial image generation model and the feature image generation model separately. The object images outputted by the initial image generation model and the feature image generation model respectively have specific similarities. The object image outputted by the feature image generation model includes the target attribute. The attribute mask image may reflect an image region corresponding to the attribute type of the target attribute in the object image. The target joint mask image may reflect a joint image region of the attribute type of the target attribute in the first initial object image and the first feature object image. The second initial object image and the second feature object image are fused based on the target joint mask image. The image region corresponding to the target attribute in the second feature object image may be fused into the second initial object image. In this way, the reference object image obtained after fusion equivalently has the target attribute without changing other attributes of the second initial object image. In other words, the reference object image is equivalent to an image obtained by performing target attribute editing on the second initial object image. Target attribute editing performed on an output image of the initial image generation model may be implemented quickly based on the initial image generation model, the feature image generation model, and the target joint mask image without manual fine editing. This improves efficiency of image editing and also ensures accuracy of image editing.

In one aspect, step S202 includes:

performing adversarial learning on an initial image generation network and an initial image discrimination network based on the first training image set to obtain an intermediate image generation network and an intermediate image discrimination network; obtaining the initial image generation model based on the intermediate image generation network; performing adversarial learning on the intermediate image generation network and the intermediate image discrimination network based on the second training image set to obtain a target image generation network and a target image discrimination network; and obtaining the feature image generation model based on the target image generation network.

The image generation network and the image discrimination network are also machine learning models. Input data of the image generation network is a random variable, and output data of the image generation model is an image. Input data of the image discrimination network is an image, and output data of the image discrimination network is an image label used for indicating whether the input image is genuine or fake. The image generation network may also be referred to as an image generator, and the image discriminator network may also be referred to as an image discriminator.

The initial image generation network is a to-be-trained image generation network, and the initial image discrimination network is a to-be-trained image generation network. The intermediate image generation network is an image generation network trained based on the first training image set, and the intermediate image discrimination network is an image discrimination network trained based on the first training image set. The target image generation network is an image generation network obtained by fine-tuning based on the second training image set, and the target image discrimination network is an image discrimination network obtained by fine-tuning based on the second training image set.

Adversarial learning refers to making different networks learn in an adversarial mode to train desired networks. Adversarial learning is performed on the initial image generation network and the initial image discrimination network. An objective of the initial image generation network is to generate, according to a random variable, a fake image that can be considered as a genuine image. An objective of the initial image discrimination network is to distinguish a fake image outputted by the initial image generation network from a genuine image as much as possible. Adversarial learning are performed on the initial image generation network and the initial image discrimination network and parameters are adjusted constantly. A final objective is to make the image generation network deceive the image discrimination network as much as possible, so that the image discrimination network cannot determine whether an output image of the image generation network is genuine or fake.

Specifically, the image generation model may be a generative adversarial network trained through adversarial learning. In a model training stage, the computer device may perform adversarial learning on the initial image generation network and the initial image discrimination network based on the first training image set. The generator tries its best to deceive judgment of the discriminator with the outputted picture, while the discriminator tries its best to distinguish a fake picture outputted by the generator from a genuine picture. Through such adversarial learning, the intermediate image generation network and the intermediate image discrimination network are obtained. In a model application stage, the computer device may obtain the initial image generation model based on the intermediate image generation network. It is to be understood that the discriminator is used to assist in model training, and during model application, the generator is mainly used.

Further, to quickly train the feature image generation model, the computer device may perform adversarial learning on the intermediate image generation network and the intermediate image discrimination network based on the second training image set. The generator tries its best to deceive judgment of the discriminator with the outputted picture, while the discriminator tries its best to distinguish a fake picture outputted by the generator from a genuine picture. Through such adversarial training, the target image generation network and the target image discrimination network are obtained, and the feature image generation model is obtained based on the target image generation network. Each object image in the second training image set includes the target attribute, so that the intermediate image generation network trained based on the second training image set may generate an object image including the target attribute. Because the intermediate image generation network and the intermediate image discrimination network have been subjected to specific model training and already have relatively good model parameters, during adversarial learning for the intermediate image generation network and the intermediate image discrimination network based on the second training image set, the target image generation network and the target image discrimination network may be quickly obtained by fine-tuning the intermediate image generation network and the intermediate image discrimination network, and thus the feature image generation model may be quickly obtained.

It is to be understood that the training method of performing adversarial learning on the image generation network and the image discrimination network may be: first, fixing the initial image generation network, and training the initial image discrimination network based on a fake image outputted by the initial image generation network and a genuine image to obtain an updated image discrimination network, where the updated image discrimination network has a specific image discrimination capability; then fixing the updated image discrimination network, and training the initial image generation network based on a predicted discrimination result of the updated image discrimination network for the image outputted by the initial image generation network and a real discrimination result to obtain an updated image generation network, where the updated image generation network has a specific image generation capability; and using the updated image generation network and the updated image discrimination network as the initial image generation network and the initial image discrimination network and repeatedly performing the foregoing iterative training until a convergence condition is met, thus obtaining the intermediate image generation network and the intermediate image discrimination network. It is to be understood that the training method of performing adversarial learning on the image generation network and the image discrimination network may be various common adversarial learning training methods. This is not limited in this disclosure.

In the foregoing aspect, adversarial learning is performed on the initial image generation network and the initial image discrimination network based on the first training image set to obtain the intermediate image generation network and the intermediate image discrimination network; the initial image generation model is obtained based on the intermediate image generation network; adversarial learning is performed on the intermediate image generation network and the intermediate image discrimination network based on the second training image set to obtain the target image generation network and the target image discrimination network; and the feature image generation model is obtained based on the target image generation network. In this way, an image generation network capable of generating a fake image that can be considered as a genuine image may be quickly trained through adversarial learning, to quickly obtain an initial image generation model. An image generation network that can generate an image including a specific attribute may be quickly trained based on a specific training image set through further adversarial learning, to quickly obtain a feature image generation model.

In one aspect, the image editing method further includes: acquiring a first candidate image set, first candidate images in the first candidate image set being object images corresponding to the target category objects; performing image alignment on the first candidate images based on the positions of a reference object part of the target category objects in the first candidate images; and obtaining the first training image set based on the first candidate images subjected to image alignment.

The image editing method further includes: acquiring a second candidate image set, second candidate images in the second candidate image set being object images corresponding to the target category objects and including the target attribute; performing image alignment on the second candidate images based on the positions of the reference object part of the target category objects in the second candidate images; and obtaining the second training image set based on the second candidate images subjected to image alignment.

The first candidate image set is used for generating the first training image set. The first candidate image set includes a plurality of first candidate images, and the first candidate images are the object images corresponding to the target category objects. The second candidate image set is used for generating the second training image set. The second candidate image set includes a plurality of second candidate images, and the second candidate images are the object images corresponding to the target category objects and including the target attribute.

Image alignment is used for aligning positions of an object body part in object images. In the object images subjected to image alignment, the object body part is located in the same position in the images. A training set obtained after image alignment is beneficial to increasing the model training speed. For example, image alignment is used for aligning positions of facial features in face images. Image alignment is used for aligning positions of a vehicle body in vehicle images.

The reference object part of the target category objects is a preset object part, and is an object part of which the positions need to be aligned during image alignment.

Specifically, object images in the training image set may be original images corresponding to the target category objects. However, to further reduce the training difficulty and increase the training speed, the object images in the training image set may be images obtained after image alignment.

For the first training image set, a first candidate image set including original object images corresponding to the target category objects may be acquired. Image alignment is performed on first candidate images in the first candidate image set based on the positions of the reference object part of the target category objects in the first candidate images. The first candidate images subjected to image alignment form the first training image set.

For the second training image set, a second candidate image set including original object images corresponding to the target category objects and including the target attribute may be acquired. Image alignment is performed on second candidate images in the second candidate image set based on the positions of the reference object part of the target category objects in the first candidate images. The second candidate images subjected to image alignment form the second training image set.

During image alignment, a preset position corresponding to the reference object part may be used as a reference position, the reference position is used as a benchmark, positions of the reference object part in the candidate images are adjusted based on the reference position, the positions of the reference object part in the candidate images are aligned with the reference position, and the positions of the reference object part in the candidate images are fixed onto the reference position, so that image alignment is completed. The preset position refers to a position that is set in advance. Alternatively, any candidate image in the candidate images may be acquired as a reference image, the other candidate images are aligned with the reference image, the position corresponding to the reference object part in the reference image is used as a reference position, the reference position is used as a benchmark, and positions of the reference object part in the other candidate images are fixed onto the reference position, so that image alignment is completed.

Face images are used as an example. A batch of face images may form the first candidate image set. Positions of eyes or facial features in the face images are used for alignment among the face images, and the aligned face images are used to form the first training image set. A batch of face images with the slicked-back hair attribute may form the second candidate image set. Positions of eyes or facial features in the face images are used for alignment among the face images, and the aligned face images are used to form the second training image set. An affine transformation algorithm may be used to deform the face, so that facial features of the face are fixed to a specific position.

In the foregoing aspect, the first training image set and the second training image set are obtained after image alignment, which can effectively reduce the model training difficulty and improve the training efficiency.

In one aspect, the acquiring a target joint mask image based on the attribute mask images includes:

using the attribute mask image corresponding to the first initial object image as a first mask image, and using the attribute mask image corresponding to the first feature object image as a second mask image, the first initial object image and the first feature object image being images of different sizes, and the first mask image and the second mask image being images of different sizes; and performing size alignment on the first mask image and the second mask image, and obtaining the target joint mask image based on the first mask image and the second mask image subjected to size alignment.

The first initial object image and the first feature object image may correspond to different sizes. For example, the first random variable is inputted into the initial image generation model and the feature image generation model. The first initial object image is an image outputted by the sixth layer in the initial image generation model, and the first feature object image is an image outputted by the eighth layer in the feature image generation model. The first mask image is the attribute mask image corresponding to the first initial object image, and the second mask image is the attribute mask image corresponding to the first feature object image. In a case that the first initial object image and the first feature object image are object images of different sizes, the first mask image and the second mask image are attribute mask images of different sizes.

Size alignment is used to unify sizes of different images to a same size to facilitate data processing. For example, performing size alignment on two images may refer to enlarging or shrinking one image, so that the size of the image is consistent with the size of the other image. It is to be understood that during size alignment, in a case that an image is enlarged or shrunk, the content of the image is simultaneously enlarged or shrunk. For example, during size alignment, in a case that a face image is enlarged, the face presented in the face image is also enlarged.

Specifically, in a case that the first mask image and the second mask image are attribute mask images of different sizes, during generation of the target joint mask image, the first mask image and the second mask image may be transformed to attribute mask images of a same size and then fused, to obtain the final target joint mask image. For example, size transformation may be performed on the first mask image to obtain a transform mask image of a same size as the second mask image, and the transform mask image and the second mask image are fused to obtain a target joint mask image.

It is to be understood that in a case that the first initial object image and the first feature object image are object images of a same size, the attribute mask images respectively corresponding to the first initial object image and the first feature object image may be directly fused to obtain the target joint mask image, without size transformation.

In the foregoing aspect, during generation of the target joint mask image, in a case that the first mask image corresponding to the first initial object image and the second mask image corresponding to the first feature object image are images of different sizes, size alignment is first performed on the first mask image and the second mask image, and then the first mask image and the second mask image subjected to size alignment are fused to obtain the target joint mask image. In this way, size alignment is performed before fusion, such that the fusion difficulty is reduced and an accurate target joint mask image can be obtained quickly.

In one aspect, the fusing the second initial object image and the second feature object image based on the target joint mask image to obtain a reference object image includes:

acquiring, from the second initial object image, an image region matching a shielded region in the target joint mask image as a first image region; fusing the second initial object image and the second feature object image to obtain a fused object image; acquiring, from the fused object image, an image region matching a non-shielded region in the target joint mask image as a second image region; and obtaining the reference object image based on the first image region and the second image region.

Specifically, in a case that the second initial object image and the second feature object image are fused based on the target joint mask image, the image region, matching the shielded region in the target joint mask image, in the second initial object image may be used as the first image region. The first image region is used for retaining image information of a region incoherent with the target attribute in the second initial object image. The second initial object image and the second feature object image are fused, and the image region matching the non-shielded region in the target joint mask image is acquired from the fused object image as the second image region. The second image region is a region coherent with the target attribute in the object image, and equivalently has the target attribute to a specific extent. Finally, the first image region and the second image region are combined to obtain the reference object image. The second image region determined from the fused object image not only has the target attribute, but also can be combined with the first image region to obtain the reference object image having more natural connection between the image regions.

In the foregoing aspect, the image region matching the shielded region in the target joint mask image is acquired from the second initial object image as the first image region. The first image region is used for guaranteeing that, during target attribute editing, the image information of the region incoherent with the target attribute in the second initial object remains unchanged. The second initial object image and the second feature object image are fused to obtain the fused object image. The image region matching the non-shielded region in the target joint mask image is acquired from the fused object image as the second image region. The second image region is used for guaranteeing that, during target attribute editing, the image information of the region coherent with the target attribute in the second initial object image has the target attribute. Finally, the reference object image obtained based on the first image region and the second image region may present an accurate target attribute editing effect.

In one aspect, the acquiring, from the second initial object image, an image region matching a shielded region in the target joint mask image as a first image region includes: performing size transformation on the target joint mask image to obtain a transformed joint mask image of a same size as the second initial object image; performing re-masking processing on the transformed joint mask image to obtain a re-masked joint mask image; and fusing the second initial object image and the re-masked joint mask image to obtain the first image region.

The acquiring, from the fused object image, an image region matching a non-shielded region in the target joint mask image as a second image region includes: fusing the fused object image and the transformed joint mask image to obtain the second image region.

The re-masking processing is used for transforming an original shielded region in a mask image to a non-shielded region, and transforming an original non-shielded region in the mask image to a shielded region. For example, the shielded part in the first mask image is represented by a pixel value 0, the non-shielded part is represented by a pixel value 1. After re-masking processing is performed on the first mask image, the original shielded part in the first mask image is represented by a pixel value 1, and the original non-shielded part is represented by a pixel value 0.

Specifically, to facilitate subsequent data processing, size transformation may be first performed on the target joint mask image to obtain the transformed joint mask image of a same size as the second initial object image. During acquiring the first image region from the second initial object image, re-masking processing is first performed on the transformed joint mask image to obtain the re-masked joint mask image, and then the second initial object image and the re-masked joint mask image are fused to obtain the first image region. For example, pixel values of pixel points at a same position in the second initial object image and the re-masked joint mask image are multiplied to obtain the first image region. It is to be understood that the first image region here is equivalent to an image of a same size as the second initial object image. A region non-coherent with the target attribute in the first image region is the non-shielded part, and a region coherent with the target attribute is the shielded part. For example, the slicked-back hair attribute is used as an example. The first image region is equivalent to an image obtained by shielding a hair part in the second initial object image and displaying a non-hair part.

During acquiring the second image region from the fused object image, the second image region may be obtained by fusing the fused object image and the transformed joint mask image. It is to be understood that the second image region here is equivalent to an image of a same size as the second initial object image. A region coherent with the target attribute in the second image region is the non-shielded part, and a region non-coherent with the target attribute is the shielded part. For example, the slicked-back hair attribute is used as an example. The second image region is equivalent to an image obtained by displaying a hair part in the fused object image and shielding a non-hair part.

During obtaining the reference object image based on the first image region and the second image region, the reference object image may be obtained by superimposing and fusing the first image region and the second image region.

In the foregoing aspect, size transformation is performed on the target joint mask image to obtain the transformed joint mask image of a same size as the second initial object image. Performing data processing on images of a same size may reduce the data processing difficulty and improves the data processing efficiency. Re-masking processing is performed on the transformed joint mask image to obtain the re-masked joint mask image. Through the re-masking processing, a region that needs to remain unchanged in the second initial object image during target attribute editing may be identified. The first image region may be obtained quickly by fusing the second initial object image and the re-masked joint mask image.

Figure 3:
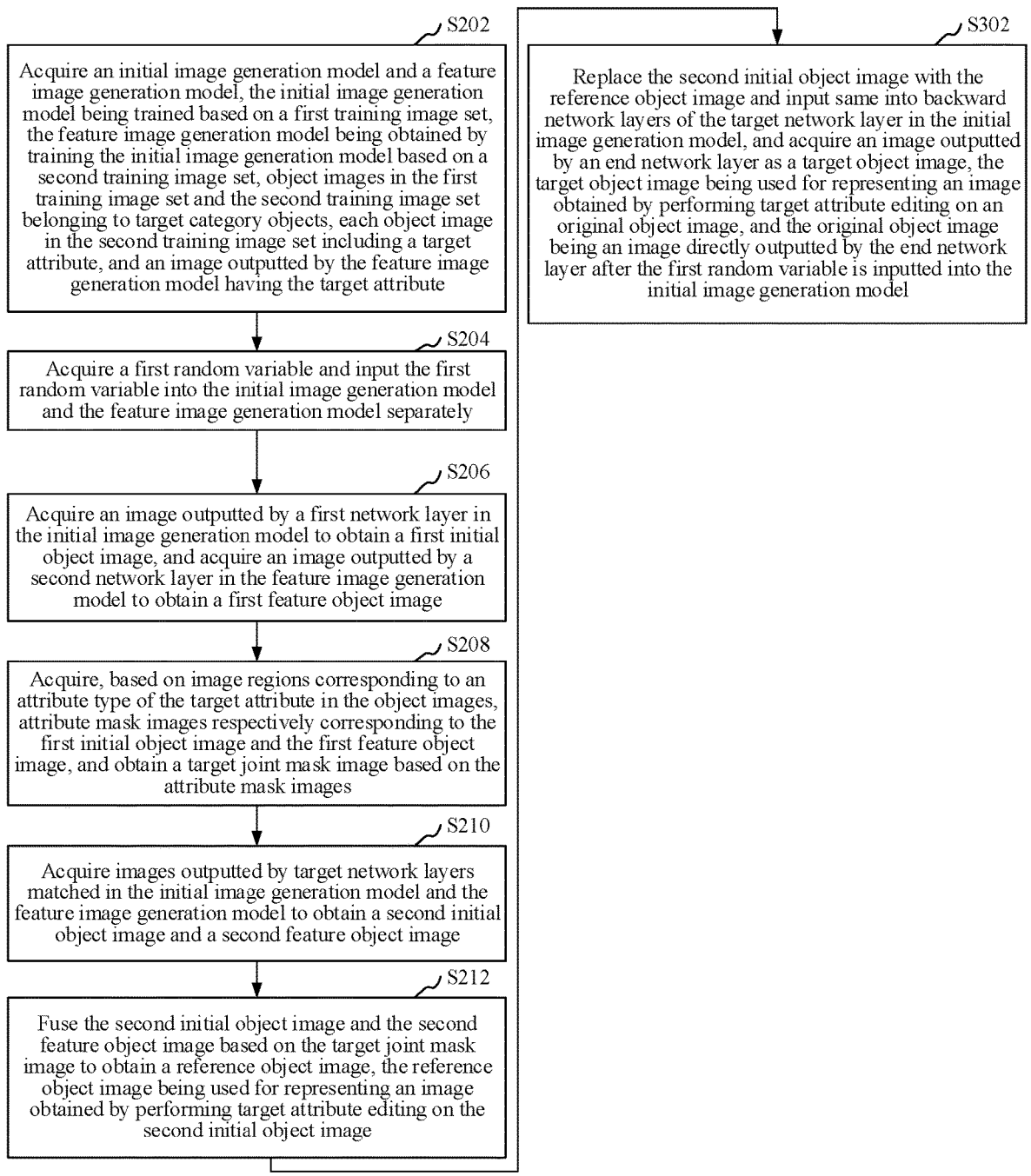
FIG. 3 is a schematic flowchart of an image editing method according to another aspect.

In one aspect, as shown in FIG. 3, the image editing method further includes the following step:

Step S302: Replace the second initial object image with the reference object image and input same into backward (i.e., downstream) network layers of the target network layer in the initial image generation model, and acquire an image outputted by an end network layer as a target object image, the target object image being used for representing an image obtained by performing target attribute editing on an original object image, and the original object image being an image directly outputted by the end network layer after the first random variable is inputted into the initial image generation model.

The backward network layers refer to network layers connected after the target network layer. The end network layer is the last network layer in the model.

The original object image refers to an image directly outputted by the end network layer of the initial image generation model after the first random variable is inputted into the initial image generation model. In other words, after the first random variable is inputted into the initial image generation model, the model is not subjected to any processing, and the image outputted by the end network layer of the initial image generation model is used as the original object image. Different from the original object image, for the target object image, after the first random variable is inputted into the initial image generation model, the model is processed, the second initial object image outputted by the target network layer in the initial image generation model d is acquired and processed to obtain the reference object image, the second initial object image is replaced with the reference object image and then the reference object image is inputted into the backward network layers of the target network layer in the initial image generation model for further data processing, and finally, the image outputted by the end network layer of the initial image generation model is used as the target object image. The target object image is used for representing an image obtained by performing target attribute editing on the original object image.

Specifically, to improve the quality of target attribute editing, after obtaining the reference object image, the computer device may replace the second initial object image with the reference object image and input same into the backward network layers of the target network layer in the initial image generation model, continue forward calculation in the model, and finally use the image outputted by the end network layer of the initial image generation model as the target object image. It is to be understood that data processing through the backward network layers in the model may increase detail information in the image and smoothen dissonance in the image, and thus finally, the end network layer may output an image with higher quality.

In the foregoing aspect, the second initial object image is replaced with the reference object image and then the reference object image is inputted into the backward network layers of the target network layer in the initial image generation model for forward calculation. The end network layer of the initial image generation model may output the target object image with higher image quality. The target object image may represent an image with high quality obtained by performing target attribute editing on the original object image. The original object image is an image directly outputted by the end network layer of the initial image generation model after the first random variable is inputted into the initial image generation model.

Figure 4:
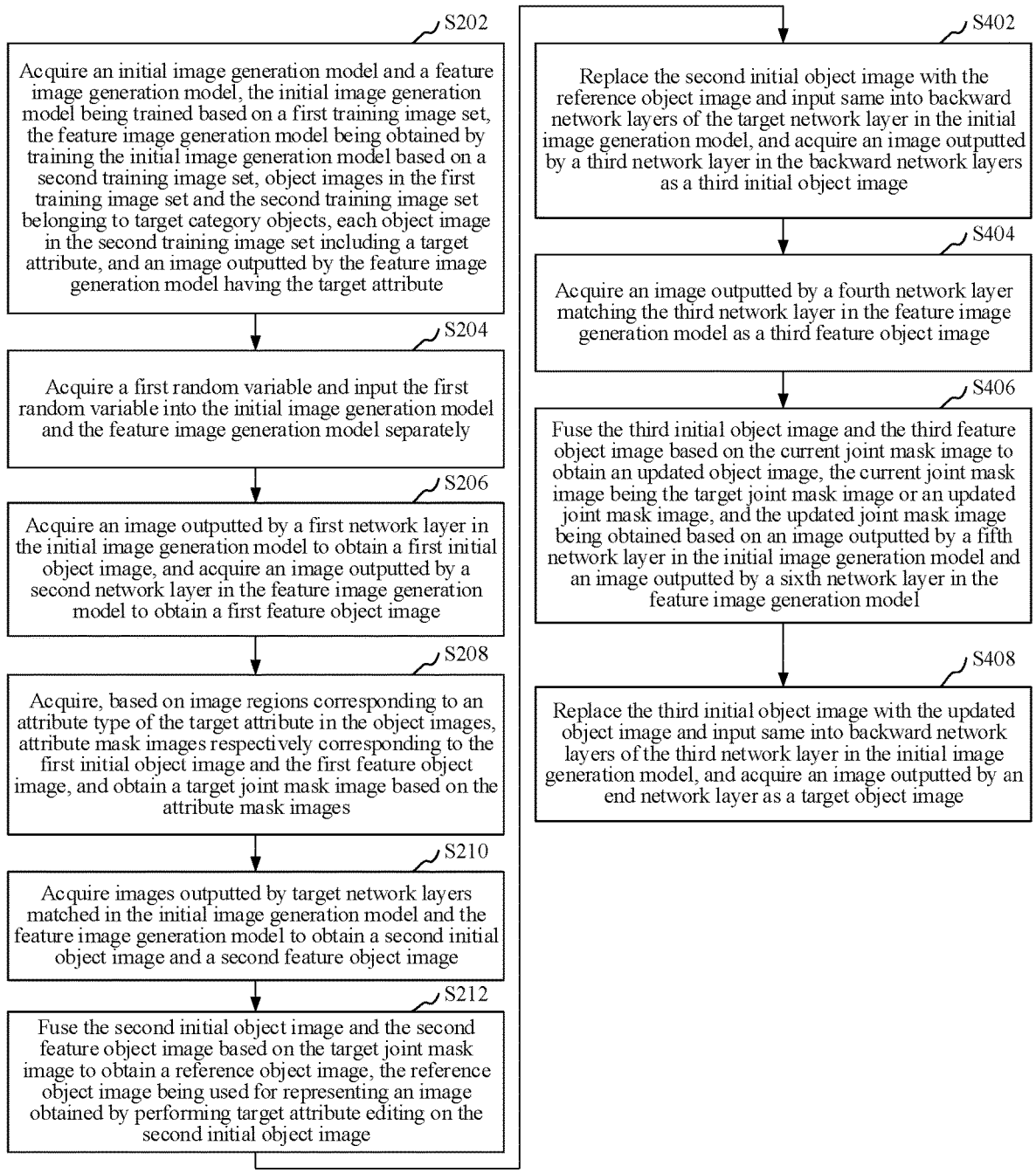
FIG. 4 is a schematic flowchart of an image editing method according to still another aspect.

In one aspect, as shown in FIG. 4, the replacing the second initial object image with the reference object image and input same into backward network layers of the target network layer in the initial image generation model, and acquiring an image outputted by an end network layer as a target object image includes the following steps:

Step S402: Replace the second initial object image with the reference object image and input same into the backward network layers of the target network layers in the initial image generation model, and acquire an image outputted by a third network layer in the backward network layers as a third initial object image.

Step S404: Acquire an image outputted by a fourth network layer matching the third network layer in the feature image generation model as a third feature object image.

The third network layer is any one of the backward network layers of the target network layer in the initial image generation model. The fourth network layer matching the third network layer is a network layer matching said third network layer in the backward network layers of the target network layer in the feature image generation model. The third network layer and the fourth network layer may be network layers having a same layer serial number in the two models.

For example, the target network layers matched in the initial image generation model and the feature image generation model are eleventh layers in the two models. The third network layer may be a thirteenth layer in the initial image generation model, and the fourth network layer matching the third network layer may be a thirteenth layer in the feature image generation model.

It is to be understood that there is no absolute forward/backward relationship between the third network layer and the first network layer. The third network layer may be a forward network layer of the first network layer or may be a backward network layer of the first network layer. There is no absolute forward/backward relationship between the fourth network layer and the second network layer. The fourth network layer may be a forward network layer of the second network layer or may be a backward network layer of the second network layer.

Step S406: Fuse the third initial object image and the third feature object image based on the current joint mask image to obtain an updated object image, the current joint mask image being the target joint mask image or an updated joint mask image, and the updated joint mask image being obtained based on an image outputted by a fifth network layer in the initial image generation model and an image outputted by a sixth network layer in the feature image generation model.

Step S408: Replace the third initial object image with the updated object image and input same into backward network layers of the third network layer in the initial image generation model, and acquire an image outputted by the end network layer as the target object image.

The updated joint mask image refers to a joint mask image different from the target joint mask image, and is a new joint mask image. The method for generating the updated joint mask image is similar to the method for generating the target joint mask image. The first random variable is inputted into the initial image generation model and the feature image generation model. The image outputted by the fifth network layer in the initial image generation model is acquired as the third initial object image. The image outputted by the sixth network layer in the feature image generation model is acquired as the third feature object image. Attribute mask images respectively corresponding to the third initial object image and the third feature object image are acquired based on image regions corresponding to the attribute type of the target attribute in the object images. The updated joint mask image is obtained based on the acquired attribute mask images.

It is to be understood that the fifth network layer and the first network layer may be a same network layer or may be different network layers. The sixth network layer and the second network layer may be a same network layer or may be different network layers. The fifth network layer and the sixth network layer may be a same network layer or may be different network layers.

Specifically, for a process from the operation of replacing the second initial object image with the reference object image and then inputting same into the backward network layers of the target network layer in the initial image generation model to the operation of outputting the target object image from the initial image generation model, refer to the method for obtaining the reference object image. A fusion operation may be performed again based on a same or different joint mask image, to improve the quality of the target object image finally outputted by the initial image generation model and improve the quality of target attribute editing.

After the reference object image is obtained by the first fusion, the computer device replaces the second initial object image with the reference object image and inputs same into the backward network layers of the target network layer in the initial image generation model for further forward calculation for the model. The image outputted by the third network layer in the backward network layers may be acquired as the third initial object image. Correspondingly, an image outputted by a network layer matching the third network layer in the feature image generation model is acquired as the third feature object image. The computer device may fuse the third initial object image and the third feature object image based on a same joint mask image or a new joint mask image to obtain an updated object image, replace the third initial object image with the updated object image and input same into the backward network layers of the third network layer in the initial image generation model, and acquire the image outputted by the end network layer as the target object image.

Each fusion may be performed based on a same joint mask image. For example, each fusion is performed based on the target joint mask image. Alternatively, each fusion may be performed based on a different joint mask image. For example, the first fusion is performed based on the target joint mask image, and the second fusion is performed based on the updated joint mask image.

It is to be understood that at least one fusion operation may be performed before the initial image generation model outputs the target object image, and the quality of the target object image is improved as the quantity of fusions increases.

In one aspect, in a case that the attribute editing complexity corresponding to the target attribute is greater than or equal to preset complexity, a first preset quantity of fusion operations are performed; in a case that the attribute editing complexity corresponding to the target attribute is less than the preset complexity, a second preset quantity of fusion operations are performed. The first preset quantity is greater than the second preset quantity. In this way, in a case that the target attribute is difficult to edit, more fusion operations can be performed to guarantee the quality of target attribute editing, and in a case that the target attribute is easy to edit, fewer fusion operations can be performed to guarantee the efficiency of target attribute editing. The attribute editing complexity is used for representing the complexity and precision of attribute editing. The attribute editing complexity may be determined based on at least one piece of data such as a quantity of attributes included in the target attribute and a size of an image region corresponding to the target attribute. For example, editing three attributes at the same time needs more fusion operations than editing only one attribute. Because the area of a hair region is larger than that of whiskers, editing the hair attribute needs more fusion operations than editing whiskers.

In the foregoing aspect, in the process of replacing the second initial object image with the reference object image and inputting same into the backward network layers of the target network layer in the initial image generation model for forward calculation, the operation of fusing the initial object image and the feature object image based on the joint mask image may be performed again, to further improve the quality of the target object image finally outputted by the end network layer of the initial image generation model and improve the precision of the target attribute editing.

Figure 5:
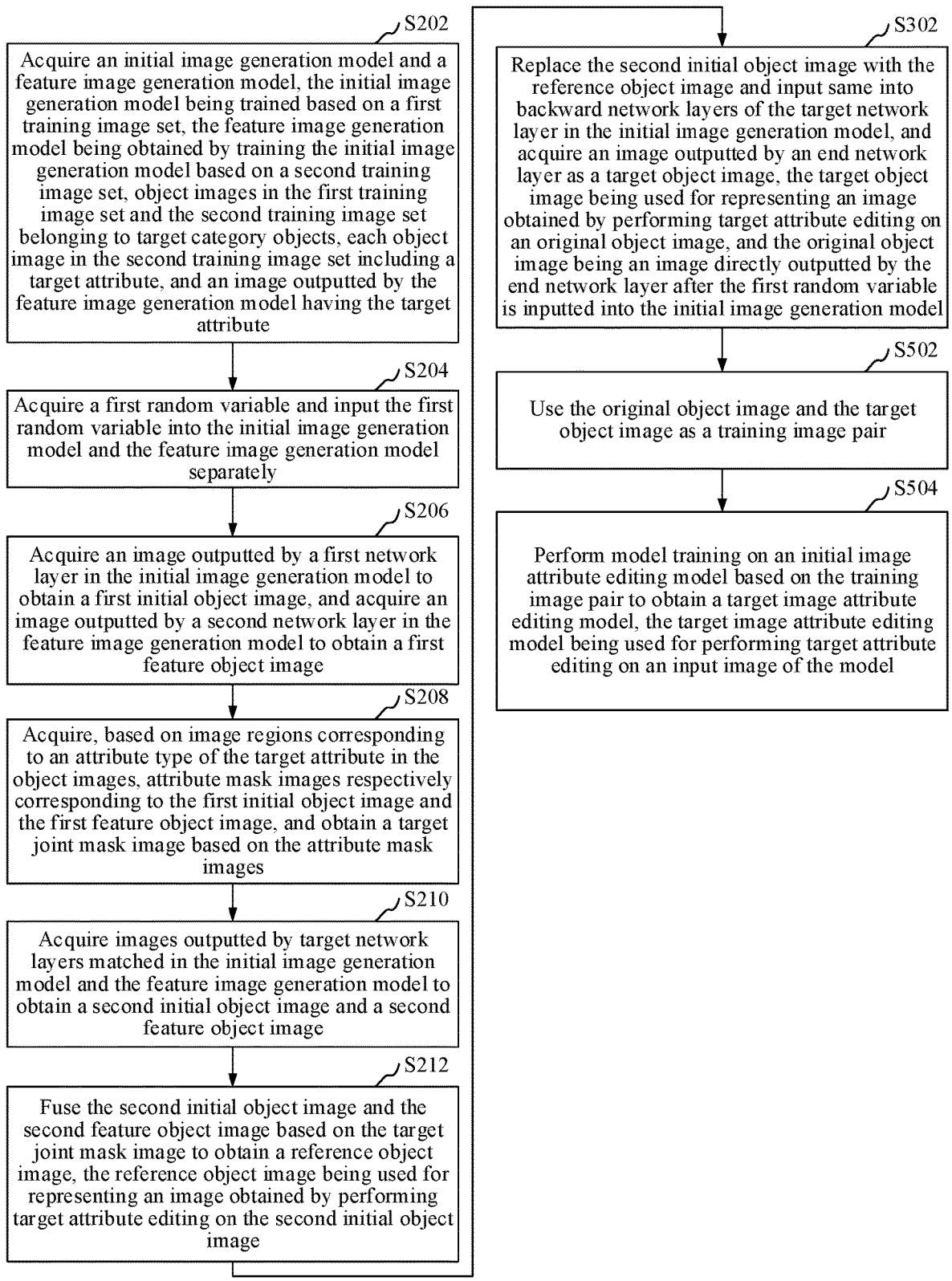
FIG. 5 is a schematic flowchart of training an image attribute editing model according to an aspect.

In one aspect, as shown in FIG. 5, the image editing method further includes the following steps:

Step S502: Use the original object image and the target object image as a training image pair.

Step S504: Perform model training on an initial image attribute editing model based on the training image pair to obtain a target image attribute editing model, the target image attribute editing model being used for performing target attribute editing on an input image of the model.

Input data of the image attribute editing model is an image, and output data of the image attribute editing model is an image subjected to attribute editing. For example, the image attribute editing model is a slicked-back hair editing model, and the slicked-back hair editing model is configured to edit a hair style in an input image as slicked-back hair. The initial image attribute editing model is a to-be-trained image attribute editing model, and the target image attribute editing model is a trained image attribute editing model.

Specifically, a large quantity of paired object images may be generated according to the image editing method in this disclosure, and the paired object images are used as training data of the image attribute editing model. The computer device may use the original object image and the target object image as the training image pair. The training image pair is used as training data of the image attribute editing model, and model training is performed on the initial image attribute editing model based on the training image pair. The target image attribute editing model configured to perform target attribute editing on the input image of the model may be trained.

During model training, the original object image in the training image pair is used as input data of the initial image attribute editing model, the target object image in the training image pair is used as expected output data of the initial image attribute editing model, and through supervised training, the original object image is inputted into the model and the model may output an image that is very close to the target object image. In other words, the model has the capability of performing target attribute editing on the input image, thus obtaining the target image attribute editing model.

It is to be understood that different training image pairs may be obtained by using different random variables. One random variable corresponds to one training image pair. Training image pairs form a training image pair set. Model training is performed on the initial image attribute editing model based on the training image pair set to obtain the target image attribute editing model.

In one aspect, the image attribute editing model may also be a generative adversarial network.

In the foregoing aspect, a large quantity of paired object images may be generated quickly according to the image editing method in this disclosure, and the paired object images are used as training data of the image attribute editing model. In the related technology, the cost of acquiring a large quantity of paired object images is high. However, the original object image and the target object image obtained according to the image editing method in this disclosure can be used as a training image pair to train the image attribute editing model, and a large quantity of paired object images may be obtained quickly and accurately according to the image editing method in this disclosure.

In one aspect, network layers connected in sequence in each of the initial image generation model and the feature image generation model are used for outputting images having gradually increased sizes. In the initial image generation model and the feature image generation model, images outputted by corresponding network layers in the same order have a same size.

The initial image generation model includes network layers connected in sequence. The network layers connected in sequence are used for outputting images having gradually increased sizes. In the initial image generation model, an output image of the current network layer is used as input data of a next network layer, and the next network layer may perform further data processing on the output image of the current network layer to improve image quality, and output an image of a larger size. It is to be understood that the end network layer of the initial image generation model outputs an image having the largest size, the highest resolution, the richest and most harmonious image details, and the best image quality. Similarly, the feature image generation model also includes network layers connected in sequence. The network layers connected in sequence are used for outputting images having gradually increased sizes. The initial image generation model and the feature image generation model include a same quantity of network layers. Images outputted by corresponding network layers in the same order in the initial image generation model and the feature image generation model have the same size.

In the foregoing aspect, the network layers connected in sequence in each of the initial image generation model and the feature image generation model are used for outputting images having gradually increased sizes. The initial image generation model and the feature image generation model may finally output images with high resolution and good quality. Images outputted by corresponding network layers in the same order in the initial image generation model and the feature image generation model have the same size. In a case that the images outputted by the corresponding network layers in the same order in the initial image generation model and the feature image generation model are fused based on the joint mask image, accurate target attribute editing may be implemented, thus guaranteeing an editing effect.

In one aspect, the target category objects are faces, the initial image generation model is an initial face image generation model, the feature image generation model is a feature face image generation model, and the target attribute is a target local face attribute.

In a case that the target category objects are faces, the images in the first training image set are face images, and the images in the second training image set are face images with the target attribute. The initial image generation model based on the first training image set is an initial face image generation model. The initial face image generation model is configured to generate a face image. A random variable is inputted into the initial face image generation model, and then the initial face image generation model may output a fake face image that can be considered as a genuine face image. The feature image generation model obtained by training the initial face image generation model based on the second training image set is a feature face image generation model, and the feature face image generation model is configured to generate a face image with the target attribute. The random variable is inputted into the feature face image generation model, and then the feature face image generation model may output a face image with the target attribute.

In a case that the target category objects are faces, the target attribute is the target local face attribute. The target local face attribute is a local face attribute determined from a large quantity of local face attributes. The local face attributes are used for describing local information of a face. For example, the local face attributes may be a variety of hair attributes, the local face attributes may be a variety of face expressions, or the local face attributes may be a variety of beard attributes. The target local face attribute may be one, two, or more of the local face attributes.

Specifically, the image editing method in this disclosure may be specifically applied to face images. A first random variable is acquired. The first random variable is inputted into an initial face image generation model and a feature face image generation model separately. An image outputted by a first network layer in the initial face image generation model is acquired to obtain a first initial face image. An image outputted by a second network layer in the feature face image generation model is acquired to obtain a first feature face image. Attribute mask images respectively corresponding to the first initial face image and the first feature face image are acquired based on image regions corresponding to an attribute type of the target attribute in the face images. A target joint mask image is obtained based on the attribute mask images. Images outputted by target network layers matched in the initial face image generation model and the feature face image generation model are acquired to obtain a second initial face image and a second feature face image. The second initial face image and the second feature face image are fused based on the target joint mask image to obtain a reference face image. The reference face image is used for representing an image obtained by performing target attribute editing on the second initial face image.

Further, the second initial face image is replaced with the reference face image and then the reference face image is inputted into backward network layers of the target network layer in the initial face image generation model, and an image outputted by an end network layer is acquired as a target face image. An original face image is an image directly outputted by the end network layer of the model after the first random variable is inputted to the initial face image generation model. The original face image and the target face image are used as a training face image pair.

Model training is performed on an initial face image attribute editing model based on the training face image pair to obtain a target face image attribute editing model. The target face image attribute editing model is configured to perform target attribute editing on an input face image of the model.

In the foregoing aspect, the target category objects are faces. The initial image generation model is the initial face image generation model. The feature image generation model is the feature face image generation model. The target attribute is a target local face attribute. According to the image editing method in this disclosure, target attribute editing performed on the initial face image outputted by the initial image generation model may be implemented, which improves the efficiency of target attribute editing for the face image.

In one specific aspect, the image editing method in this disclosure may be applied to face picture local attribute editing. The face picture local attribute editing specifically refers to changing a specific local attribute of a face picture in a targeted manner, while maintaining the other attributes of the face picture unchanged. For example, the hairstyle of a character is changed to slicked-back hair, but facial features do not change at all. The image editing method in this disclosure is a simple and efficient method, with which non-dichotomous accurate editing for a face local attribute can be completed. A batch of face picture data with a same target attribute is mainly collected, so that corresponding attribute editing for a face semantic region with the target attribute may be implemented.

Figure 6:
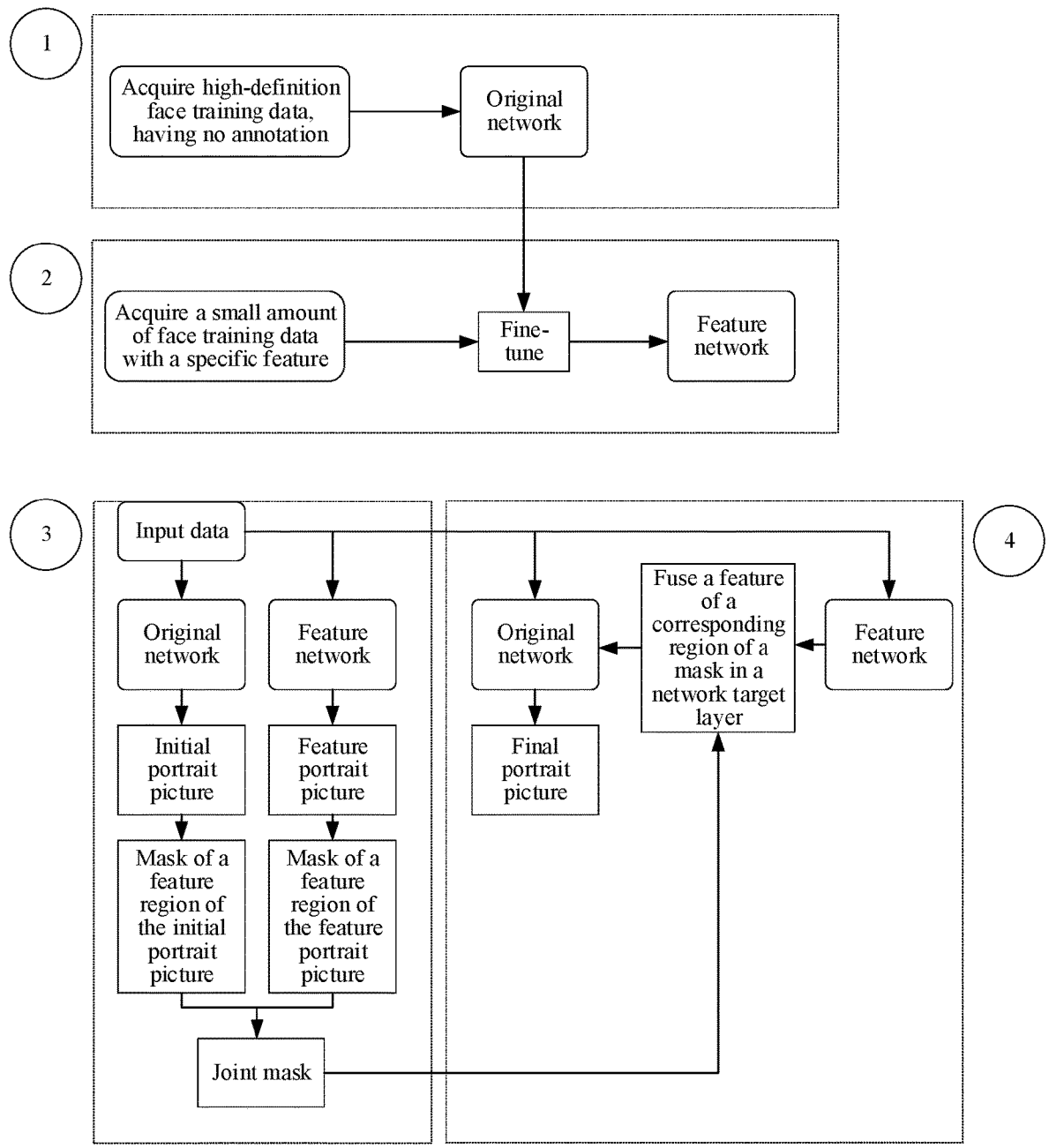
FIG. 6 is a schematic flowchart of an image editing method applied to a portrait picture according to an aspect.

As shown in FIG. 6, the image editing method in this disclosure includes the following steps:

1. Train an original network.

A batch of high-definition face pictures having no annotation is collected as face training data, positions of eyes are then used for face position alignment among the face pictures, and the aligned face pictures are used to train a generative adversarial network. The network is denoted as an original network (that is, an initial image generation model).

2. Fine-tune the original network to obtain a feature network.

A small batch of high-definition face pictures having a common feature (that is, a target attribute) but having no annotation is collected as face training data, for example, the common feature is slicked-back hair, positions of eyes are then used for face position alignment among the face pictures, and the aligned face pictures are used to perform fine-tune training on the original network to obtain a new generative adversarial network, which is denoted as a feature network (that is, a feature image generation model).

In one aspect, the generative adversarial network includes a noise conversion network and a picture synthesis network. Input data of the noise conversion network is noise and output data of the noise conversion network is intermediate implicit code. Input data of the picture synthesis network is the intermediate implicit code and output data of the picture synthesis network is a picture. A noise vector z sampled from Gaussian noise is first converted into intermediate implicit code w by the noise conversion network. Then, the intermediate implicit code w is converted by an affine transformation layer in each layer of the picture synthesis network into a modulation parameter used in each layer. Finally, the network may output a high-definition face picture. Different intermediate implicit code w may be considered to correspond to different high-definition face pictures. In one aspect, the generative adversarial network may be StyleGAN2. In the process of training the original network, the noise conversion network needs to be adjusted, and in the process of fine-tuning the original network to obtain the feature network, the noise conversion network does not need to be adjusted.

3. Acquire a joint mask.

Synchronous inference is performed on the original network and the feature network to obtain face pictures. Masks of corresponding specific feature regions (that is, regions coherent with the target attribute) are acquired by using a mask model or other user-defined methods. Then, a joint mask image is generated.

For example, the same noise vector z (inputted into the noise conversion network) or the same intermediate implicit code w (inputted into the picture synthesis network) may be inputted into the original network and the feature network to acquire an initial portrait picture and a feature portrait picture respectively. For example, images outputted by end network layers of the original network and the feature network are used as the initial portrait picture and the feature portrait picture. Because the feature network is obtained by fine-tuning the original network, information of the two pictures, such as face orientation, is roughly the same. Masks of target feature regions of the initial portrait picture and the feature portrait picture are acquired respectively by using the mask model or other user-defined methods. For example, in a case that the target attribute is the slicked-back hair attribute, the masks may be specifically hair masks. Finally, a joint mask, which is denoted as a mask, is obtained based on the two masks.

4. Complete attribute editing based on the joint mask.

Synchronous inference is performed on the original network and the feature network. In the inference process, features of a corresponding region of the joint mask in a target layer of the feature network are fused into the original network. Then, inference continues to be performed on the original network, and finally, interference of the original network is completed and a final portrait picture is obtained.

Figure 7:
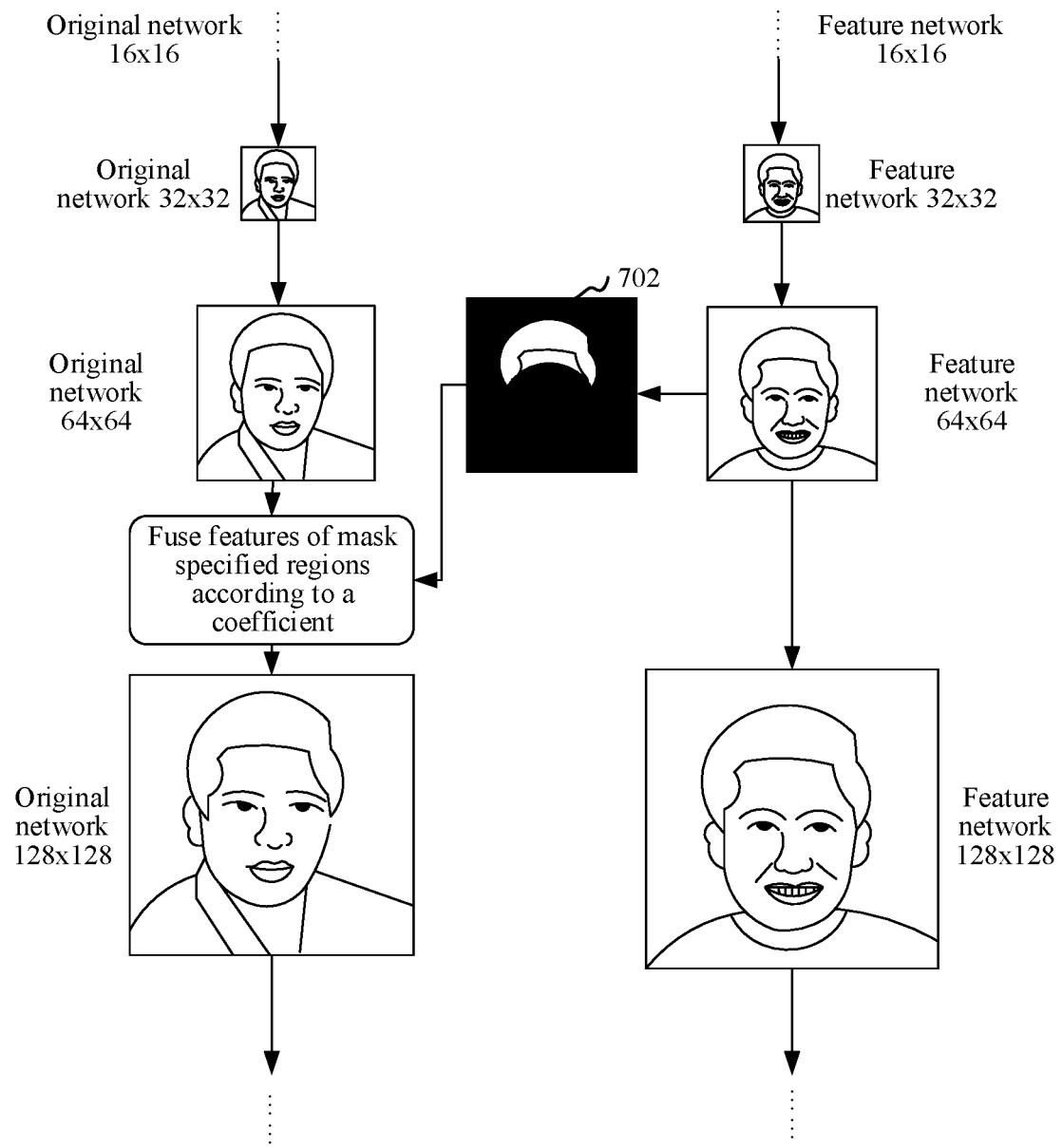
FIG. 7 is a schematic diagram of feature fusion according to an aspect.

For example, the same noise vector z (inputted into the noise conversion network) or the same intermediate implicit code w (inputted into the picture synthesis network) may be inputted into the original network and the feature network. In this process, features of a specified region of the joint mask in a specific layer are fused according to a coefficient. For example, the generative adversarial network is of a pyramid structure. Refer to FIG. 7, starting with a low resolution, pictures generated by the network gradually increase in size layer by layer. The output feature size of the eleventh layer of the generative adversarial network is 64×64. The output of the eleventh layer of the original network is denoted as $f_{o_{11}}$. The output of the eleventh layer of the feature network is denoted as $f_{t_{11}}$. By using a size adjustment algorithm such as bilinear interpolation, the resolution of the mask is adjusted to 64×64, which is denoted as $mask_{64}$. A fusion coefficient a is set. A calculating formula for a fused feature image is as follows:

$$f_{in_{11}} = f_{o_{11}} * (1 - mask_{64}) + (f_{o_{11}} * a + f_{t_{11}} * (1-a)) * mask_{64}$$

A value of a ranges from 0 to 1. In one aspect, the value of 1−a is greater than a, so that more information about the target attribute may be fused into the image, to further guarantee that $f_{o_{11}} * a + f_{t_{11}} * (1-a)$ has an attribute that is closer to or consistent with the target attribute and further guarantee that $f_{in_{11}}$ has an attribute that is closer to or consistent with the target attribute. In one aspect, the value of a ranges from 0 to 0.3.

$f_{o_{11}}$ is replaced with a fused feature $f_{in_{11}}$ for further forwarding of the original network. Finally, a high-definition picture subjected to attribute editing may be obtained. An image outputted by an end network layer of the original network is used as the final high-definition picture subjected to attribute editing, that is, the final portrait picture. For example, the end network layer of the original network may output an image with a resolution of 1024×1024. In this disclosure, controllable editing is finally implemented to generate a high-definition face picture at a pixel level of 1024×1024.

It is to be understood that the operation of fusing the features of the mask specified regions in the specific layer according to the coefficient may be performed at least once. For example, fusion is performed on both the eleventh layer and the twelfth layer based on a same joint mask or different joint masks. 702 in FIG. 7 represents $f_{t_{11}}*mask_{64}$.

Figure 8:
FIG. 8 is a schematic diagram of slicked-back hair editing effects of faces according to an aspect.

FIG. 8 is a schematic diagram of initial portrait pictures, feature portrait pictures, and final portrait pictures. Portrait pictures in a same column in FIG. 8 are obtained based on different intermediate implicit code, and portrait pictures in a same row in FIG. 8 are obtained based on the same intermediate implicit code.

Figure 9:
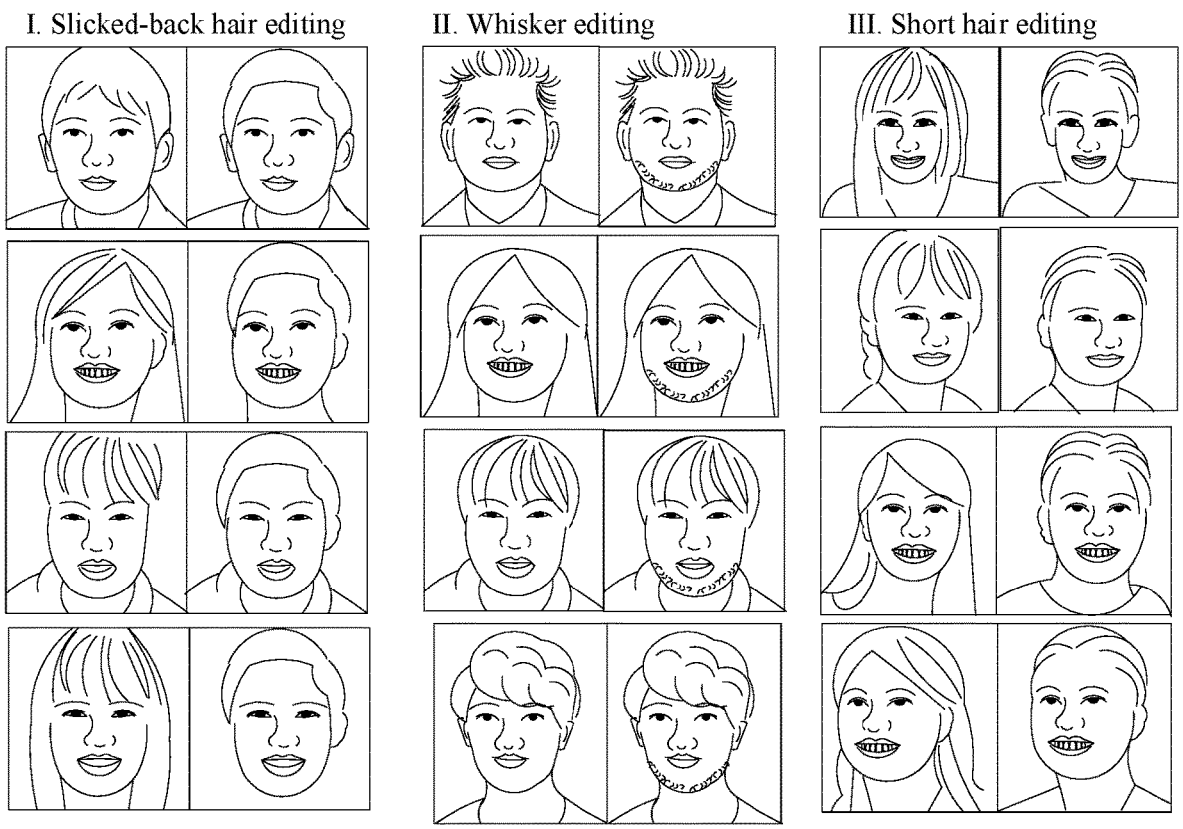
FIG. 9 is a schematic diagram of attribute editing effects of faces according to an aspect.

It is to be understood that this method may implement a variety of local attribute editing for a variety of local regions. For different face attributes, different specific face attribute editing may be completed by repeating only the second, third, and fourth steps. FIG. 9 is a schematic diagram of slicked-back hair editing, whisker editing, and short hair editing.

Currently, it is difficult to collect paired real face pictures. However, according to the image editing method in this disclosure, a large quantity of paired face attribute editing training samples may be generated, and are used for supporting data for training of other generative adversarial networks. For example, the initial portrait picture and the final portrait picture form a pair of face attribute editing training samples. A face attribute editing network may be trained by using a large quantity of paired face attribute editing training samples. The face attribute editing network may be used for various front-end face attribute editing tasks, such as an expression editing function and a hairstyle editing function applied in applications.

Certainly, the image editing method in this disclosure may be further applied to local attribute editing for other images, for example, applied to local attribute editing for animal images and applied to local attribute editing for object images.

It is to be understood that although the steps in the flowcharts involved in the aspects described above are shown in sequence as indicated by arrows, the steps are not necessarily performed in sequence as indicated by the arrows. Unless otherwise explicitly specified in this disclosure, an execution sequence of the steps is not strictly limited, and the steps may be performed in other sequences. In addition, at least some of the steps in the flowcharts involved in the aspects described above may include a plurality of steps or a plurality of stages. The steps or stages are not necessarily performed at a same moment but may be performed at different moments. An execution sequence of the steps or stages is not necessarily performed in sequence, but may be performed in turn or alternately with other steps or at least some of steps or stages of other steps.

An aspect of this disclosure further provides an image editing apparatus for implementing the image editing method involved above. The implementation scheme to solve the problem provided by the apparatus is similar to the implementation scheme recorded in the foregoing method. Therefore, for specific restrictions in one or more image editing apparatus aspects provided below, refer to the foregoing restrictions on the image editing method. Details are not described here again.

Figure 10:
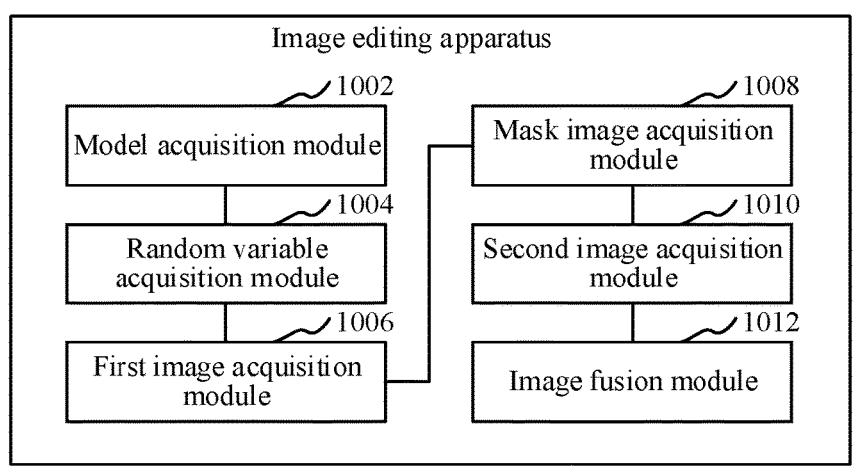
FIG. 10 is a structural block diagram of an image editing apparatus according to an aspect.

In one aspect, as shown in FIG. 10, an image editing apparatus is provided, including: a model acquisition module 1002, a random variable acquisition module 1004, a first image acquisition module 1006, a mask image acquisition module 1008, a second image acquisition module 1010, and an image fusion module 1012.

The model acquisition module 1002 is configured to acquire an initial image generation model and a feature image generation model. The initial image generation model is trained based on a first training image set. The feature image generation model is obtained by training the initial image generation model based on a second training image set. Object images in the first training image set and the second training image set belong to target category objects. Each object image in the second training image set includes a target attribute. An image outputted by the feature image generation model has the target attribute.

The random variable acquisition module 1004 is configured to acquire a first random variable and input the first random variable into the initial image generation model and the feature image generation model separately. The initial image generation model is trained based on the first training image set. The feature image generation model is obtained by training the initial image generation model based on the second training image set. The first training image set and the second training image set include object images corresponding to the target category objects. Each object image in the second training image set is an object image including the target attribute. An image outputted by the feature image generation model has the target attribute.

The first image acquisition module 1006 is configured to acquire an image outputted by a first network layer in the initial image generation model to obtain a first initial object image, and acquire an image outputted by a second network layer in the feature image generation model to obtain a first feature object image.

The mask image acquisition module 1008 is configured to acquire, based on image regions corresponding to an attribute type of the target attribute in the object images, attribute mask images respectively corresponding to the first initial object image and first feature object image, and obtain a target joint mask image based on the attribute mask images.

The second image acquisition module 1010 is configured to acquire images outputted by target network layers matched in the initial image generation model and the feature image generation model to obtain a second initial object image and a second feature object image.

The image fusion module 1012 is configured to fuse the second initial object image and the second feature object image based on the target joint mask image to obtain a reference object image. The reference object image is used for representing an image obtained by performing target attribute editing on the second initial object image.

In one aspect, the model acquisition module 1002 is further configured to:

perform adversarial learning on an initial image generation network and an initial image discrimination network based on the first training image set to obtain an intermediate image generation network and an intermediate image discrimination network; obtain the initial image generation model based on the intermediate image generation network; perform adversarial learning on the intermediate image generation network and the intermediate image discrimination network based on the second training image set to obtain a target image generation network and a target image discrimination network; and obtain the feature image generation model based on the target image generation network.

Figure 11:
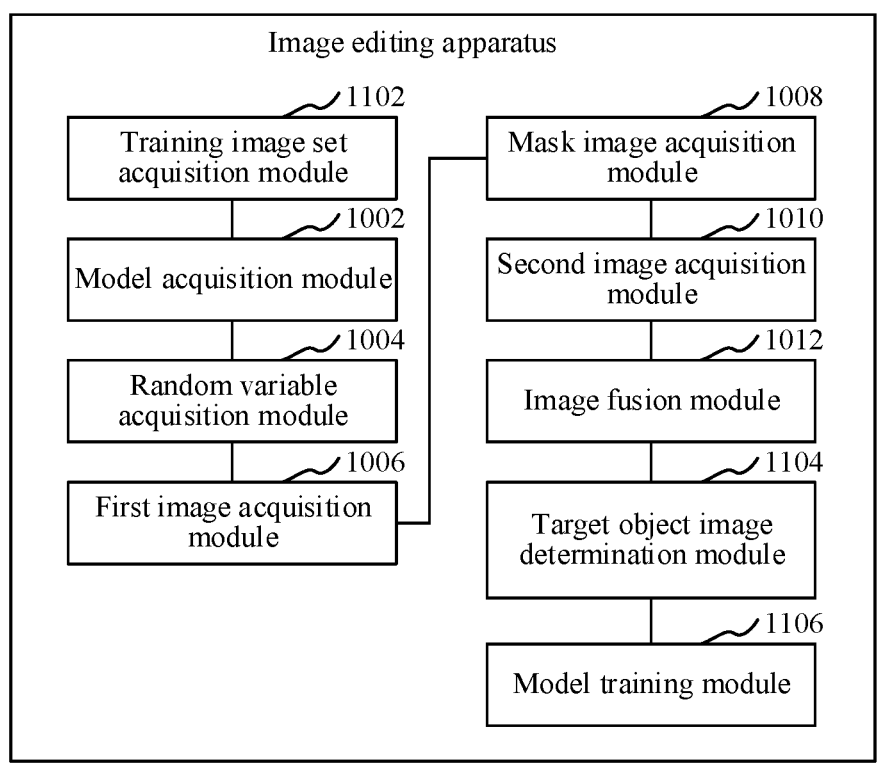
FIG. 11 is a structural block diagram of an image editing apparatus according to another aspect.

In one aspect, as shown in FIG. 11, the image editing apparatus further includes:

a training image set acquisition module 1102, configured to: acquire a first candidate image set, first candidate images in the first candidate image set being object images corresponding to the target category objects; perform image alignment on the first candidate images based on the positions of a reference object part of the target category objects in the first candidate images; obtain the first training image set based on the first candidate images subjected to image alignment; acquire a second candidate image set, second candidate images in the second candidate image set being object images corresponding to the target category objects and including the target attribute; perform image alignment on the second candidate images based on the positions of the reference object part of the target category objects in the second candidate images; and obtain the second training image set based on the second candidate images subjected to image alignment.

In one aspect, the mask image acquisition module 1008 is further configured to:

use the attribute mask image corresponding to the first initial object image as a first mask image, and use the attribute mask image corresponding to the first feature object image as a second mask image, the first initial object image and the first feature object image being images of different sizes, and the first mask image and the second mask image being images of different sizes; and perform size alignment on the first mask image and the second mask image, and obtain the target joint mask image based on the first mask image and the second mask image subjected to size alignment.

In one aspect, the image fusion module 1012 is further configured to:

acquire, from the second initial object image, an image region matching a shielded region in the target joint mask image as a first image region; fuse the second initial object image and the second feature object image to obtain a fused object image; acquire, from the fused object image, an image region matching a non-shielded region in the target joint mask image as a second image region; and obtain the reference object image based on the first image region and the second image region.

In one aspect, the image fusion module 1012 is further configured to:

perform size transformation on the target joint mask image to obtain a transformed joint mask image of a same size as the second initial object image; perform re-masking processing on the transformed joint mask image to obtain a re-masked joint mask image; and fuse the second initial object image and the re-masked joint mask image to obtain the first image region.

The image fusion module 1012 is further configured to: fuse the fused object image and the transformed joint mask image to obtain the second image region.

In one aspect, as shown in FIG. 11, the image editing apparatus further includes:

a target object image determination module 1104, configured to replace the second initial object image with the reference object image and input same into backward network layers of the target network layer in the initial image generation model, and acquire an image outputted by an end network layer as a target object image. The target object image is used for representing an image obtained by performing target attribute editing on an original object image. The original object image is an image directly outputted by the end network layer after a first random variable is inputted into the initial image generation model.

In one aspect, the target object image determination module 1104 is further configured to:

replace the second initial object image with the reference object image and input same into the backward network layers of the target network layer in the initial image generation model, and acquire an image outputted by a third network layer in the backward network layers as a third initial object image; acquire an image outputted by a fourth network layer matching the third network layer in the feature image generation model as a third feature object image; fuse the third initial object image and the third feature object image based on the current joint mask image to obtain an updated object image, the current joint mask image being the target joint mask image or an updated joint mask image, and the updated joint mask image being obtained based on an image outputted by a fifth network layer in the initial image generation model and an image outputted by a sixth network layer in the feature image generation model; and replace the third initial object image with the updated object image and input same into backward network layers of the third network layer in the initial image generation model, and acquire an image outputted by the end network layer as the target object image.

In one aspect, as shown in FIG. 11, the image editing apparatus further includes:

a model training module 1106, configured to: use the original object image and the target object image as a training image pair; and perform model training on an initial image attribute editing model based on the training image pair to obtain a target image attribute editing model. The target image attribute editing model is used for performing target attribute editing on an input image of the model.

In one aspect, network layers connected in sequence in each of the initial image generation model and the feature image generation model are used for outputting images having gradually increased sizes. In the initial image generation model and the feature image generation model, images outputted by corresponding network layers in the same order have a same size.

In one aspect, the target category objects are faces, the initial image generation model is an initial face image generation model, the feature image generation model is a feature face image generation model, and the target attribute is a target local face attribute.

According to the foregoing image editing apparatus, the initial image generation model is trained based on object images corresponding to the target category objects. After receiving input data, the initial image generation model may output the object images corresponding to the target category objects. The feature image generation model is obtained by training the initial image generation model based on the object images corresponding to the target category objects and including the target attribute. After receiving input data, the feature image generation model may output the object images corresponding to the target category objects and including the target attribute. The first random variable is inputted into the initial image generation model and the feature image generation model separately.

The object images outputted by the initial image generation model and the feature image generation model respectively have specific similarities. The object image outputted by the feature image generation model includes the target attribute. The attribute mask image may reflect an image region corresponding to the attribute type of the target attribute in the object image. The target joint mask image may reflect a joint image region of the attribute type of the target attribute in the first initial object image and the first feature object image. The second initial object image and the second feature object image are fused based on the target joint mask image. The image region corresponding to the target attribute in the second feature object image may be fused into the second initial object image. In this way, the reference object image obtained after fusion equivalently has the target attribute without changing other attributes of the second initial object image. In other words, the reference object image is equivalent to an image obtained by performing target attribute editing on the second initial object image. Target attribute editing performed on an output image of the initial image generation model may be implemented quickly based on the initial image generation model, the feature image generation model, and the target joint mask image without manual fine editing. This improves efficiency of image editing and also ensures accuracy of image editing.

All or some of the modules in the foregoing image editing apparatus may be implemented by using software, hardware, and a combination thereof. The foregoing modules may be embedded in a hardware form into or independent of a processor of a computer device, or may be stored in a software form in a memory of the computer device, to facilitate invoking the foregoing modules by the processor to perform corresponding operations.

Figure 12:
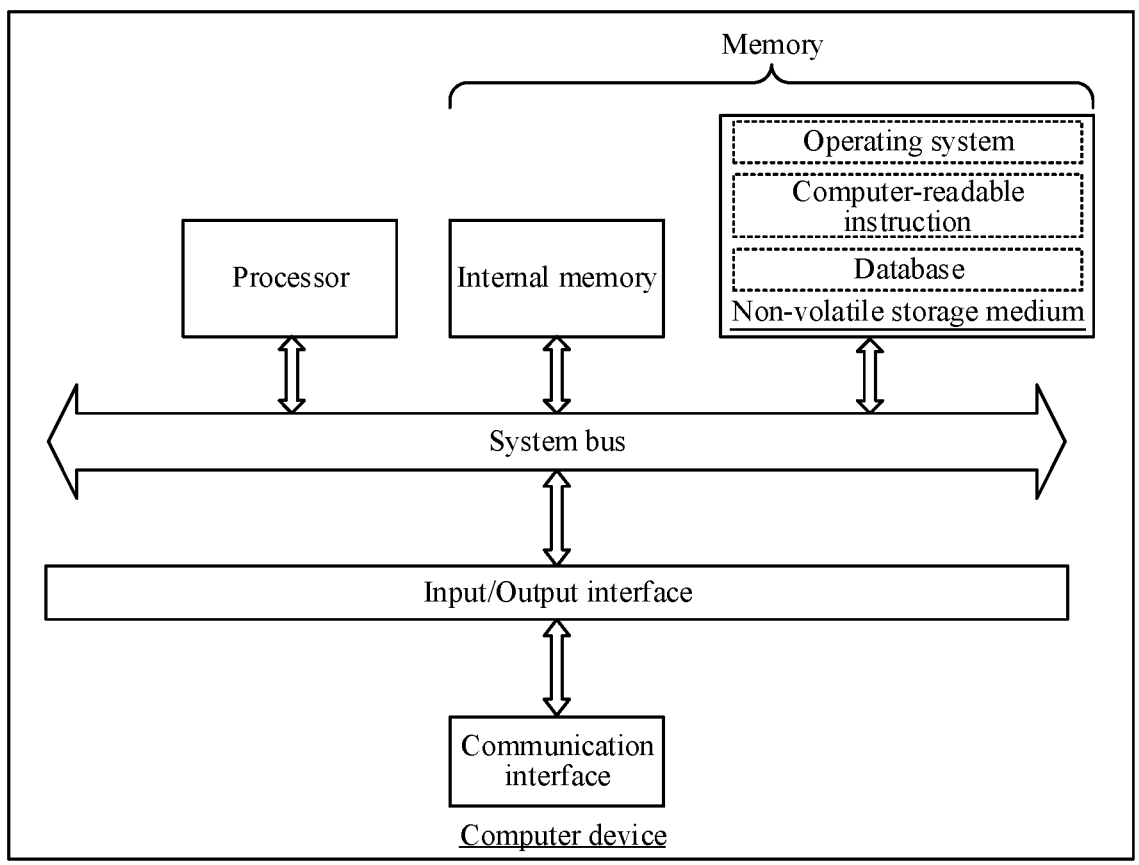
FIG. 12 is a diagram of an internal structure of a computer device according to an aspect.

In one aspect, a computer device is provided. The computer device may be a server whose internal structure diagram may be as shown in FIG. 12. The computer device includes a processor (e.g., processing circuitry), a memory (e.g., a non-transitory computer-readable storage medium), an input/output interface (short for I/O), and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile (or non-transitory) storage medium and an internal memory. The non-volatile storage medium stores an operating system, computer-readable instructions, and a database. The internal memory provides an environment for operation of the operating system and the computer-readable instructions in the non-volatile storage medium. The database of the computer device is configured to store data, for example, an initial image generation model, a feature image generation model, a reference object image, and a target object image. The input/output interface of the computer device is configured to exchange information between the processor and external devices. The communication interface of the computer device is configured to communicate with an external terminal through a network connection. The computer-readable instructions are executed by the processor to implement an image editing method.

Figure 13:
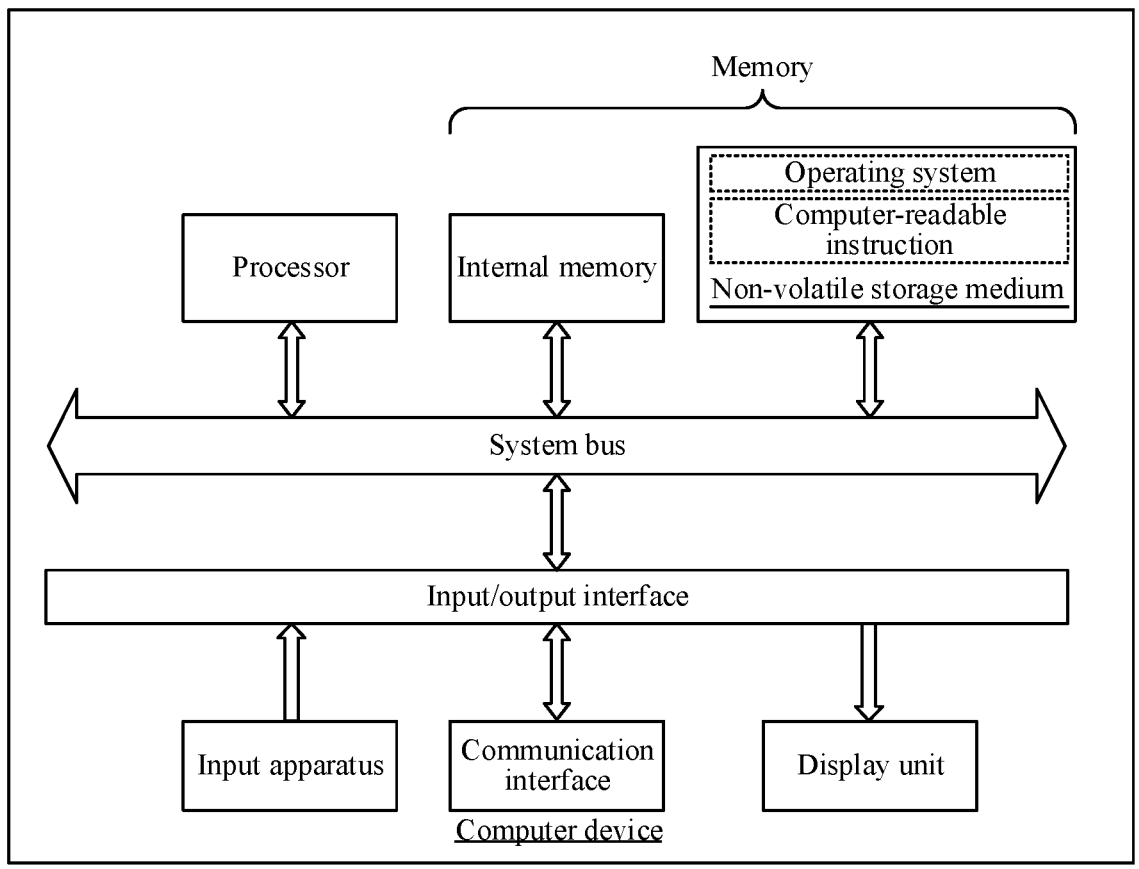
FIG. 13 is a diagram of an internal structure of a computer device according to another aspect.

In one aspect, a computer device is provided. The computer device may be a terminal whose internal structure diagram may be as shown in FIG. 13. The computer device includes a processor, a memory, an input/output interface, a communication interface, a display unit, and an input apparatus. The processor, the memory, and the input/output interfaces are connected through a system bus. The communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for operation of the operating system and the computer-readable instructions in the non-volatile storage medium. The input/output interface of the computer device is configured to exchange information between the processor and external devices. The communication interface of the computer device is configured to communicate with external terminals in a wired or wireless manner. The wireless manner may be implemented via Wi-Fi, a mobile cellular network, near field communication (NFC), or other technologies. The computer-readable instructions are executed by the processor to implement an image editing method. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covered on the display screen, may be a key, a trackball, or a touch pad provided on a shell of the computer device, or may be an external keyboard, a touch pad, a mouse, or the like.

A person skilled in the art may understand that, the structures shown in FIG. 12 and FIG. 13 are merely block diagrams of partial structures related to the solutions in this disclosure, and do not constitute a limitation to the computer device to which the solutions in this disclosure are applied. Specifically, the computer device may include more or fewer components than those shown in the figures, or have some components combined, or have a different component deployment.

In one aspect, a computer device is also provided, including a memory and a processor. The memory has computer-readable instructions stored thereon. When executing the computer-readable instructions, the processor implements the steps in the foregoing method aspects.

In one aspect, a computer-readable storage medium is provided, having computer-readable instructions stored thereon. When executed by a processor, the computer-readable instructions implement the steps in the foregoing method aspects.

In one aspect, a computer program product or computer program is provided. The computer program product or computer program includes computer-readable instructions. The computer-readable instructions are stored in a computer-readable storage medium. A processor of a computer device reads the computer-readable instructions from the computer-readable storage medium. The processor executes the computer-readable instructions, to enable the computer device to perform the steps in the foregoing method aspects.

Both user information (including but not limited to user equipment information, user personal information, or the like) and data (including but not limited to data used for analysis, data stored, data displayed, or the like) involved in this disclosure are information and data authorized by the user or fully authorized by the parties. Collection, use, and processing of relevant data shall comply with the relevant laws, regulations, and standards of the relevant countries and regions.

A person of ordinary skill in the art may understand that all or some of procedures in the foregoing aspect methods may be implemented by computer-readable instructions instructing relevant hardware. The computer-readable instructions may be stored in a non-volatile computer-readable storage medium. When the computer-readable instructions are executed, the procedures of the foregoing method aspects may be included. References to the memory, the storage, the database, or other media used in the aspects provided in this disclosure may all include at least one of a non-volatile memory or a volatile memory. The non-volatile memory may include a read-only memory (ROM), a magnetic tape, a floppy disk, a flash memory, an optical memory, a high-density embedded non-volatile memory, a resistive random-access memory (ReRAM), a magnetoresistive random access memory (MRAM), a ferroelectric random access memory (FRAM), a phase change memory (PCM), a graphene memory, and the like. The volatile memory may include a random access memory (RAM), an external cache memory, or the like. As an illustration rather than a limitation, the RAM may be in various forms, such as a static random access memory (SRAM) or a dynamic random access memory (DRAM). The databases involved in the aspects provided in this disclosure may include at least one of a relational database and a non-relational database. The non-relational database may include but be not limited to a blockchain-based distributed database. The processors involved in the aspects provided in this disclosure may be but not limited to general purpose processors, central processing units, graphics processors, digital signal processors, programmable logic devices, data processing logic devices based on quantum computing, or the like.

Technical features of the foregoing aspects may be randomly combined. To make description concise, not all possible combinations of the technical features in the foregoing aspects are described. However, the combinations of the technical features shall be considered as falling within the scope recorded by this description provided that no conflict exists.

The foregoing disclosure includes some exemplary embodiments of this disclosure which are not intended to limit the scope of this disclosure. Other embodiments shall also fall within the scope of this disclosure.

What is claimed is:

1. An image editing method, comprising:
   acquiring an initial image generation model and a feature image generation model, the initial image generation model having been trained based on a first training image set, the feature image generation model having been obtained by training the initial image generation model based on a second training image set, object images in the first training image set and the second training image set including objects of a same category, each object image in the second training image set comprising a target attribute, and an image output by the feature image generation model having the target attribute;
   based on an image editing request, inputting a value of a first variable as input data into the initial image generation model and the feature image generation model separately;
   in response to the input data, acquiring an image output by the initial image generation model to obtain a first initial object image of the category, and acquiring an image output by the feature image generation model to obtain a first feature object image of the category;
   based on image regions corresponding to the target attribute in the object images, acquiring attribute mask images respectively corresponding to the first initial object image and the first feature object image, and obtaining a joint mask image based on the attribute mask images;
   acquiring images output by corresponding target network layers in the initial image generation model and the feature image generation model to obtain a second initial object image and a second feature object image; and
   fusing the second initial object image and the second feature object image based on the joint mask image to obtain a reference object image, as a result of performing target attribute editing on the second initial object image.

2. The method according to claim 1, wherein the obtaining the initial image generation model and the feature image generation model comprises:
   performing adversarial learning on an initial image generation network and an initial image discrimination network based on the first training image set to obtain an intermediate image generation network and an intermediate image discrimination network;
   obtaining the initial image generation model based on the intermediate image generation network;
   performing adversarial learning on the intermediate image generation network and the intermediate image discrimination network based on the second training image set to obtain a target image generation network; and
   obtaining the feature image generation model based on the target image generation network.

3. The method according to claim 1, the method further comprising:
   acquiring a first candidate image set, first candidate images in the first candidate image set being object images corresponding to objects of the category;
   performing image alignment on the first candidate images based on positions of a reference object part of the objects of the category in the first candidate images;
   obtaining the first training image set based on the first candidate images subjected to the image alignment;
   acquiring a second candidate image set, second candidate images in the second candidate image set being object images corresponding to the objects of the category and comprising the target attribute;
   performing image alignment on the second candidate images based on positions of the reference object part of the objects of the category in the second candidate images; and
   obtaining the second training image set based on the second candidate images subjected to the image alignment.

4. The method according to claim 1, wherein the obtaining the target joint mask image based on the attribute mask images comprises:
   using an attribute mask image corresponding to the first initial object image as a first mask image, and using an attribute mask image corresponding to the first feature object image as a second mask image, the first initial object image and the first feature object image having different sizes, and the first mask image and the second mask image having different sizes; and
   performing size alignment on the first mask image and the second mask image, and obtaining the joint mask image based on the first mask image and the second mask image subjected to the size alignment.

5. The method according to claim 1, wherein the fusing the second initial object image and the second feature object image comprises:
   acquiring, from the second initial object image, a first image region matching a shielded region in the joint mask image;
   fusing the second initial object image and the second feature object image to obtain a fused object image;
   acquiring, from the fused object image, a second image region matching a non-shielded region in the joint mask image; and
   obtaining the reference object image based on the first image region and the second image region.

6. The method according to claim 5, wherein
   the acquiring, from the second initial object image, the first image region matching a shielded region in the target joint mask image comprises:
      performing size transformation on the joint mask image to obtain a transformed joint mask image of a same size as the second initial object image;
      performing re-masking processing on the transformed joint mask image to obtain a re-masked joint mask image; and
      fusing the second initial object image and the re-masked joint mask image to obtain the first image region; and
   the acquiring, from the fused object image, the second image region matching a non-shielded region in the joint mask image comprises:
      fusing the fused object image and the transformed joint mask image to obtain the second image region.

7. The method according to claim 1, the method further comprising:
   replacing the second initial object image with the reference object image and inputting the reference object image into downstream network layers of the target network layer in the initial image generation model, and acquiring an image output by an end network layer of the initial image generation model as a target object image, wherein
   the target object image is a result of performing target attribute editing on an original object image, which is output by the end network layer of the initial image generation model after the value of the first variable is input into the initial image generation model.

8. The method according to claim 7, wherein the replacing the second initial object image with the reference object image comprises:
   replacing the second initial object image with the reference object image and inputting the reference object image into the downstream network layers of the target network layer in the initial image generation model, and acquiring an image output by a third network layer in the downstream network layers as a third initial object image;
   acquiring an image output by a fourth network layer corresponding to the third network layer in the feature image generation model as a third feature object image;
   fusing the third initial object image and the third feature object image based on a current joint mask image to obtain an updated object image, the current joint mask image being the joint mask image or an updated joint mask image obtained based on an image output by a fifth network layer in the initial image generation model and an image output by a sixth network layer in the feature image generation model; and
   replacing the third initial object image with the updated object image and inputting the updated object image into downstream network layers of the third network layer in the initial image generation model, and acquiring an image output by the end network layer of the initial image generation model as the target object image.

9. The method according to claim 7, the method further comprising:
   using the original object image and the target object image as a training image pair; and
   performing model training on an initial image attribute editing model based on the training image pair to obtain a trained image attribute editing model, wherein the trained image attribute editing model is configured to perform target attribute editing on an input image.

10. The method according to claim 1, wherein network layers connected in sequence in each of the initial image generation model and the feature image generation model are configured to output images having gradually increased sizes, and in the initial image generation model and the feature image generation model, images output by corresponding network layers in have a same size.

11. The method according to claim 1, wherein the objects of the category are faces, the initial image generation model is an initial face image generation model, the feature image generation model is a feature face image generation model, and the target attribute is a local face attribute.

12. An image editing apparatus, the apparatus comprising:
   processing circuitry configured to
      acquire an initial image generation model and a feature image generation model, the initial image generation model having been trained based on a first training image set, the feature image generation model having been obtained by training the initial image generation model based on a second training image set, object images in the first training image set and the second training image set including objects of a same category, each object image in the second training image set comprising a target attribute, and an image output by the feature image generation model having the target attribute;
      based on an image editing request, input a value of a first variable as input data into the initial image generation model and the feature image generation model separately;
      in response to the input data, acquire an image output by the initial image generation model to obtain a first initial object image of the category, and acquire an image output by the feature image generation model to obtain a first feature object image of the category;
      based on image regions corresponding to the target attribute in the object images, acquire attribute mask images respectively corresponding to the first initial object image and the first feature object image, and obtain a joint mask image based on the attribute mask images;
      acquire images output by corresponding target network layers in the initial image generation model and the feature image generation model to obtain a second initial object image and a second feature object image; and
      fuse the second initial object image and the second feature object image based on the joint mask image to obtain a reference object image, as a result of performing target attribute editing on the second initial object image.

13. The apparatus according to claim 12, wherein the processing circuitry is further configured to:
   perform adversarial learning on an initial image generation network and an initial image discrimination network based on the first training image set to obtain an intermediate image generation network and an intermediate image discrimination network;
   obtain the initial image generation model based on the intermediate image generation network;
   perform adversarial learning on the intermediate image generation network and the intermediate image discrimination network based on the second training image set to obtain a target image generation network; and
   obtain the feature image generation model based on the target image generation network.

14. The apparatus according to claim 12, wherein the processing circuitry is further configured to:
   acquire a first candidate image set, first candidate images in the first candidate image set being object images corresponding to objects of the category;
   perform image alignment on the first candidate images based on positions of a reference object part of the objects of the category in the first candidate images;
   obtain the first training image set based on the first candidate images subjected to the image alignment;
   acquire a second candidate image set, second candidate images in the second candidate image set being object images corresponding to the objects of the category and comprising the target attribute;
   perform image alignment on the second candidate images based on positions of the reference object part of the objects of the category in the second candidate images; and
   obtain the second training image set based on the second candidate images subjected to the image alignment.

15. The apparatus according to claim 12, wherein the processing circuitry is further configured to:
   use an attribute mask image corresponding to the first initial object image as a first mask image, and use an attribute mask image corresponding to the first feature object image as a second mask image, the first initial object image and the first feature object image having different sizes, and the first mask image and the second mask image having different sizes; and
   perform size alignment on the first mask image and the second mask image, and obtain the joint mask image based on the first mask image and the second mask image subjected to the size alignment.

16. The apparatus according to claim 12, wherein the processing circuitry is further configured to:
   acquire, from the second initial object image, a first image region matching a shielded region in the joint mask image;
   fuse the second initial object image and the second feature object image to obtain a fused object image;
   acquire, from the fused object image, a second image region matching a non-shielded region in the joint mask image; and
   obtain the reference object image based on the first image region and the second image region.

17. The apparatus according to claim 16, wherein the processing circuitry is further configured to perform size transformation on the joint mask image to obtain a transformed joint mask image of a same size as the second initial object image;
   perform re-masking processing on the transformed joint mask image to obtain a re-masked joint mask image;
   fuse the second initial object image and the re-masked joint mask image to obtain the first image region; and
   fuse the fused object image and the transformed joint mask image to obtain the second image region.

18. The apparatus according to claim 12, wherein the processing circuitry is further configured to:
   replace the second initial object image with the reference object image and input the reference object image into downstream network layers of the target network layer in the initial image generation model, and acquire an image output by an end network layer of the initial image generation model as a target object image, wherein
   the target object image is a result of performing target attribute editing on an original object image, which is output by the end network layer of the initial image generation model after the value of the first variable is input into the initial image generation model.

19. The apparatus according to claim 18, wherein the processing circuitry is further configured to:
   replace the second initial object image with the reference object image and input the reference object image into the downstream network layers of the target network layer in the initial image generation model, and acquire an image output by a third network layer in the downstream network layers as a third initial object image;
   acquire an image output by a fourth network layer corresponding to the third network layer in the feature image generation model as a third feature object image;
   fuse the third initial object image and the third feature object image based on a current joint mask image to obtain an updated object image, the current joint mask image being the joint mask image or an updated joint mask image obtained based on an image output by a fifth network layer in the initial image generation model and an image output by a sixth network layer in the feature image generation model; and
   replace the third initial object image with the updated object image and input the updated object image into downstream network layers of the third network layer in the initial image generation model, and acquire an image output by the end network layer of the initial image generation model as the target object image.

20. A non-transitory computer-readable storage medium storing computer-readable instructions thereon, which, when executed by processing circuitry, cause the processing circuitry to perform an image editing method comprising:
   acquiring an initial image generation model and a feature image generation model, the initial image generation model having been trained based on a first training image set, the feature image generation model having been obtained by training the initial image generation model based on a second training image set, object images in the first training image set and the second training image set including objects of a same category, each object image in the second training image set comprising a target attribute, and an image output by the feature image generation model having the target attribute;

based on an image editing request, inputting a value of a first variable as input data into the initial image generation model and the feature image generation model separately;

in response to the input data, acquiring an image output by the initial image generation model to obtain a first initial object image of the category, and acquiring an image output by the feature image generation model to obtain a first feature object image of the category;

based on image regions corresponding to the target attribute in the object images, acquiring attribute mask images respectively corresponding to the first initial object image and the first feature object image, and obtaining a joint mask image based on the attribute mask images;

acquiring images output by corresponding target network layers in the initial image generation model and the feature image generation model to obtain a second initial object image and a second feature object image; and fusing the second initial object image and the second feature object image based on the joint mask image to obtain a reference object image, as a result of performing target attribute editing on the second initial object image.

\* \* \* \* \*